US012539335B2

(12) United States Patent
Li et al.

(10) Patent No.: US 12,539,335 B2
(45) Date of Patent: Feb. 3, 2026

(54) TRICYCLIC POLYPEPTIDE CONJUGATED DRUG AND USE THEREOF

(71) Applicant: CONJUSTAR (ZHUHAI) BIOLOGICS CO., LTD., Zhuhai (CN)

(72) Inventors: Huining Li, Shanghai (CN); Jianhua Xia, Shanghai (CN); Zhigan Jiang, Shanghai (CN); Haiying He, Shanghai (CN); Shuhui Chen, Shanghai (CN)

(73) Assignee: CONJUSTAR (ZHUHAI) BIOLOGICS CO., LTD., Zhuhai (CN)

( * ) Notice: Subject to any disclaimer, the term of this patent is extended or adjusted under 35 U.S.C. 154(b) by 27 days.

(21) Appl. No.: 18/697,004

(22) PCT Filed: Sep. 23, 2022

(86) PCT No.: PCT/CN2022/120832
§ 371 (c)(1),
(2) Date: Mar. 29, 2024

(87) PCT Pub. No.: WO2023/015396
PCT Pub. Date: Apr. 6, 2023

(65) Prior Publication Data
US 2024/0424120 A1   Dec. 26, 2024

(30) Foreign Application Priority Data

Sep. 29, 2021 (CN) .......................... 202111150517.5
Oct. 19, 2021 (CN) .......................... 202111216628.1

(51) Int. Cl.
*A61K 47/66* (2017.01)
*A61P 35/00* (2006.01)
*C07K 14/00* (2006.01)

(52) U.S. Cl.
CPC .............. *A61K 47/66* (2017.08); *A61P 35/00* (2018.01); *C07K 14/001* (2013.01)

(58) Field of Classification Search
CPC ........ A61K 47/66; A61P 35/00; C07K 14/001
See application file for complete search history.

(56) References Cited

FOREIGN PATENT DOCUMENTS

| | | | | |
|---|---|---|---|---|
| CN | 107148425 | A | 9/2017 | |
| CN | 112236442 | A | 1/2021 | |
| CN | 112566651 | A | 3/2021 | |
| CN | 112601539 | * | 4/2021 | ............. A61K 38/00 |
| CN | 112601539 | A | 4/2021 | |
| JP | H06509551 | A | 10/1994 | |
| JP | 2021520378 | A | 8/2021 | |
| RU | 2017118326 | A | 11/2018 | |
| WO | 2016144654 | A1 | 9/2016 | |
| WO | 2019122860 | A1 | 6/2019 | |
| WO | 2019193328 | A1 | 10/2019 | |
| WO | 2019243832 | A1 | 12/2019 | |
| WO | 2019243833 | A1 | 12/2019 | |
| WO | 2020120984 | A1 | 6/2020 | |
| WO | 2020225577 | A1 | 11/2020 | |
| WO | 2020264187 | A1 | 12/2020 | |
| WO | 2021019243 | A1 | 2/2021 | |
| WO | 2021019246 | A1 | 2/2021 | |
| WO | 2021028686 | A1 | 2/2021 | |
| WO | 2021074622 | A1 | 4/2021 | |
| WO | 2023051396 | A1 | 4/2023 | |

OTHER PUBLICATIONS

Baeriswyl et al., 2015, A Synthetic Factor XIIa Inhibitor Blocks Selectively Intrinsic Coagulation Initiation, ACS Chem Biol, 10: 1861.*

(Continued)

*Primary Examiner* — Amber D Steele
(74) *Attorney, Agent, or Firm* — Bayramoglu Law Offices LLC

(57) ABSTRACT

A tricyclic polypeptide conjugated drug and the use thereof are provided. Specifically provided are a compound as represented by formula (III), and a pharmaceutically acceptable salt thereof. A pharmaceutical composition comprising a therapeutically or prophylactically effective amount of the compound or the pharmaceutically acceptable salt thereof is further provided. The compound or the pharmaceutically acceptable salt thereof and the pharmaceutical composition can be used in the preparation of a drug for treating Nectin-4 overexpressed solid tumors.

9 Claims, 4 Drawing Sheets

Specification includes a Sequence Listing.

(56) References Cited

OTHER PUBLICATIONS

Chen et al., 2014, Peptide Lignads Stabilized by Small Molecules, Angew Chem Int Ed, 53: 1602-1606.*
Chen et al., 2012, Structurally Diverse Cyclisation Linkers Impose Different Backbone Conformations in Bicyclic Peptides, ChemBioChem, 13: 1032-1038.*
Curran A. Rhodes, et al., Bicyclic Peptides as Next-Generation Therapeutics, Chemistry, 2017, pp. 1-27, vol. 23 No. 52.

* cited by examiner

TRICYCLIC POLYPEPTIDE CONJUGATED DRUG AND USE THEREOF

CROSS REFERENCE TO THE RELATED APPLICATIONS

This application is the national phase entry of International Application No. PCT/CN2022/120832, filed on Sep. 23, 2022, which is based upon and claims priority to Chinese Patent Application No. 202111150517.5, filed on Sep. 29, 2021, and Chinese Patent Application No. 202111216628.1, filed on Oct. 19, 2021, the entire contents of which are incorporated herein by reference.

SEQUENCE LISTING

The instant application contains a Sequence Listing which has been submitted in XML format via EFS-Web and is hereby incorporated by reference in its entirety. Said XML copy is named GBSRWA004_Sequence_Listing.xml, created on Mar. 25, 2024, and is 12,662 bytes in size.

TECHNICAL FIELD

The present invention relates to a tricyclic polypeptide conjugated drug and the use thereof, and specifically, to a compound as represented by formula (III), and a pharmaceutically acceptable salt thereof.

BACKGROUND

Nectin-4 (poliovirus receptor like 4, PVRL4) is a newly emerging tumor-associated target in recent years, and it belongs to the Nectin protein family that mainly includes four subtypes, i.e., Nectin-1 to -4. Together with a Nectin-like molecule (Necl), Nectin-4 constitutes an immunoglobulin-like cell adhesion molecule, which plays an important role in forming and maintaining intercellular adhesion and tight junctions. Nectin-1, -2, and -3 are widely expressed in normal human tissues, and Nectin-4 is mainly highly expressed in the embryo and placenta, but its expression significantly declines in adults. Studies have shown that Nectin-4 is overexpressed in a variety of tumors, such as bladder cancer, urothelial cancer, breast cancer, triple-negative breast cancer, lung cancer, gastric cancer, esophageal cancer, etc., making it a potential target for the treatment of related cancers. At present, Enfortumab vedotin, a biological antibody-conjugated drug developed for this target, has been approved for marketing in the United States in 2019. As the only marketed drug for this target, its primary indication is metastatic urothelial cancer, and clinical efficacy studies for multiple indications are also being conducted. Therefore, the development of chemotherapeutic drugs targeting Nectin-4 has a broad application prospect.

SUMMARY

The present invention provides a compound as represented by formula (III), and a pharmaceutically acceptable salt thereof,

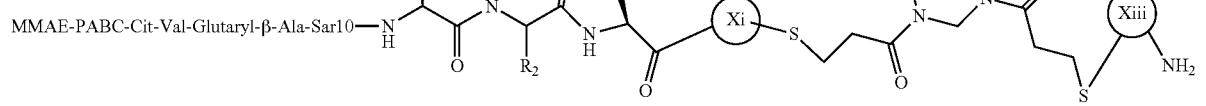

(III)

wherein
R₁ is selected from H and $C_{1-3}$ alkyl;
R₂ is selected from H, $C_{1-4}$ alkyl, and
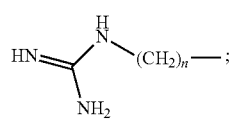
n is selected from 1, 2, 3, and 4; and
Xi, Xii, and Xiii are each independently selected from Cys, hCys, βCys, and Pen.
In some embodiments of the present invention, the above compound is selected from the structures as represented by formulas (III-1) and (III-2),
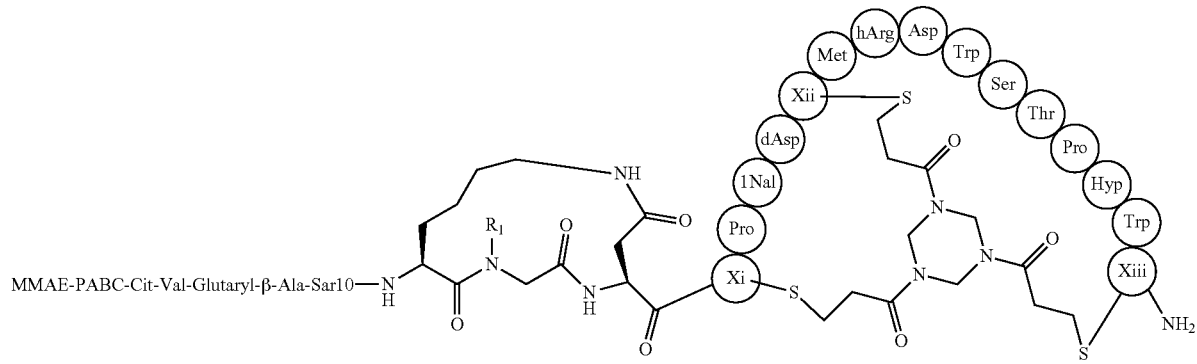
(III-1)
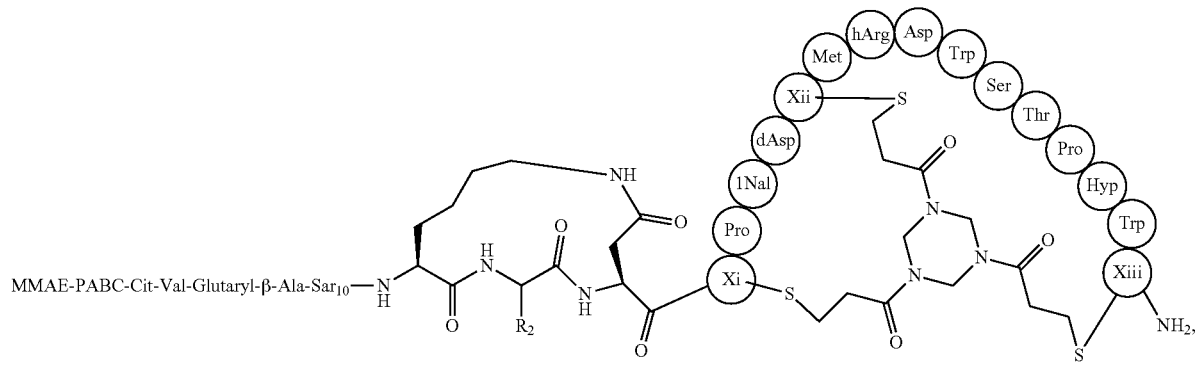
(III-2)

wherein $R_1$, $R_2$, Xi, Xii, and Xiii are as defined in the present invention.

The present invention provides a compound as represented by formula (I), or a pharmaceutically acceptable salt thereof,

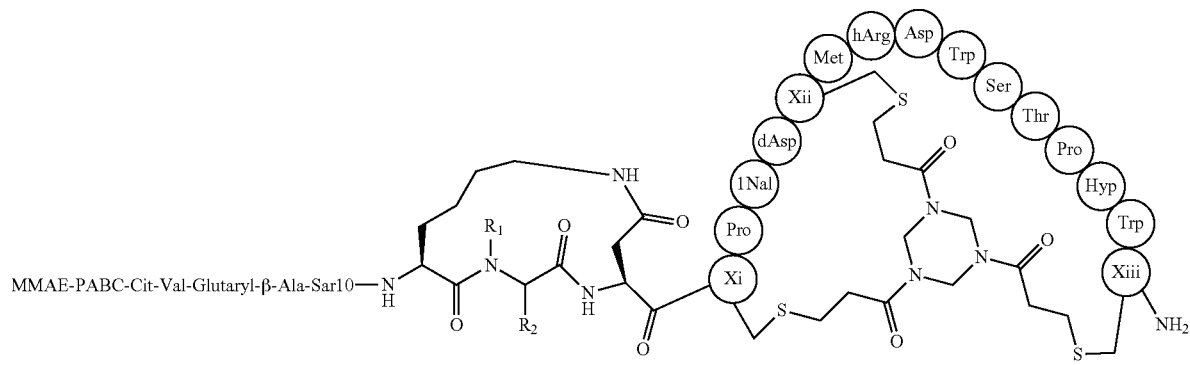

(I)

wherein $R_1$ is selected from H or $C_{1-3}$ alkyl;

$R_2$ is selected from H, $C_{1-4}$ alkyl, and

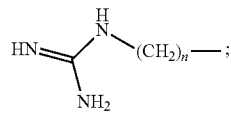

n is selected from 1, 2, 3, and 4; and

Xi, Xii, and Xiii are each independently selected from Cys, hCys, βCys, Pen, Dap, and N-methyl-Dap.

In some embodiments of the present invention, the above compound is selected from the structures as represented by formulas (I-1) and (I-2),

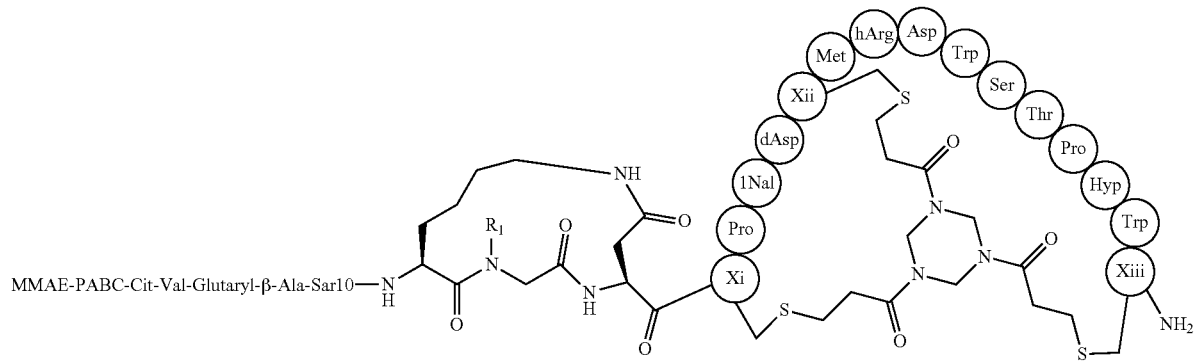

(I-1)

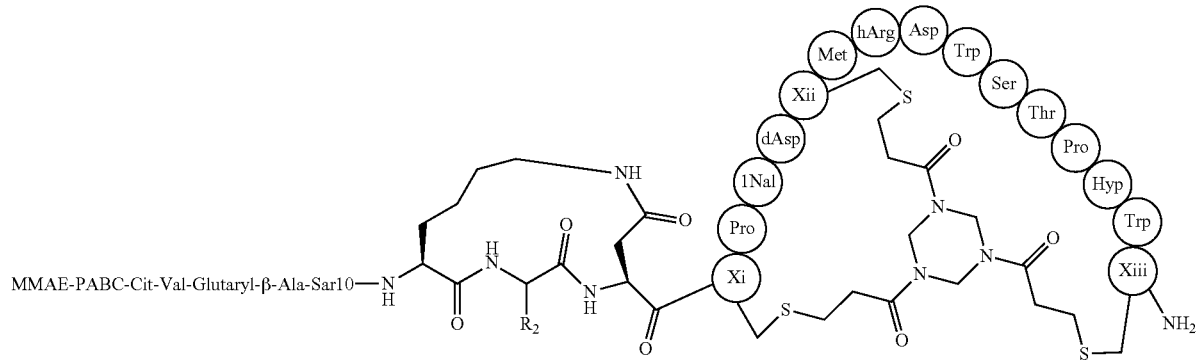
wherein $R_1$, $R_2$, Xi, Xii, and Xiii are as defined in the present invention.
Some other embodiments of the present invention are derived from any combination of the above variables.
The present invention further provides compounds as represented by the following formulas, or pharmaceutically acceptable salts thereof,
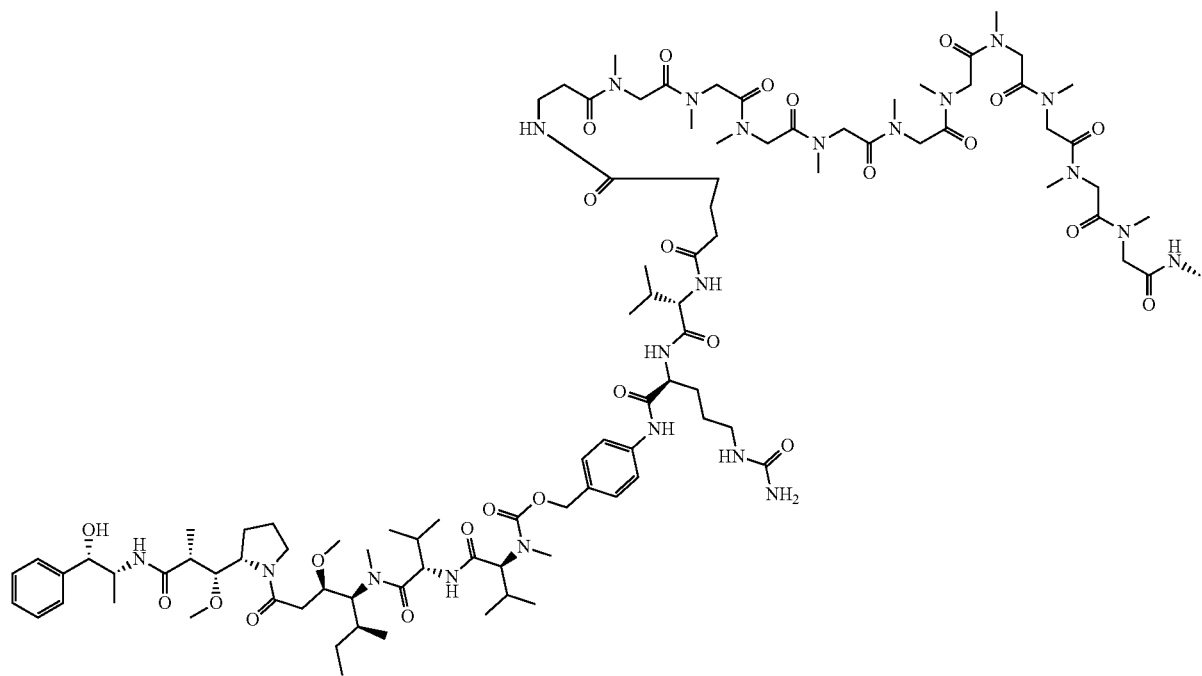

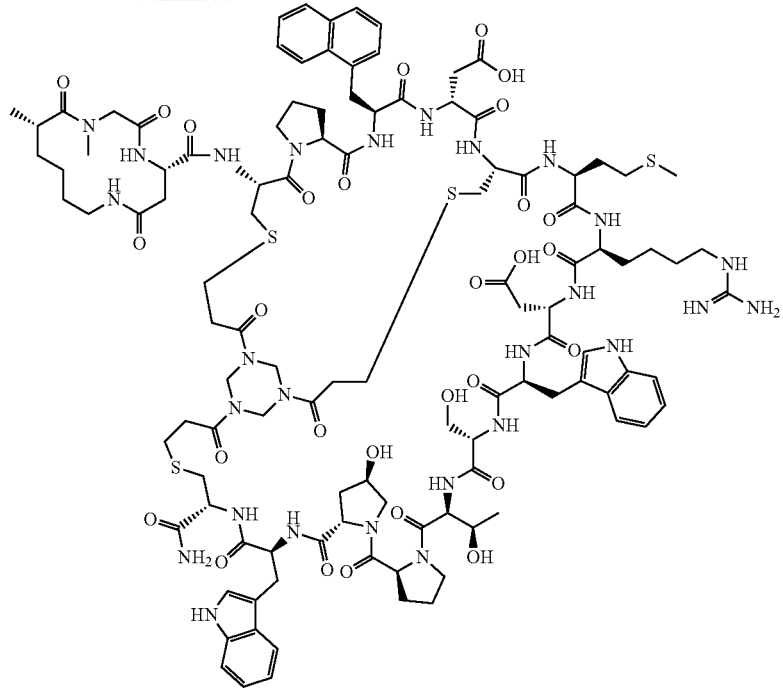
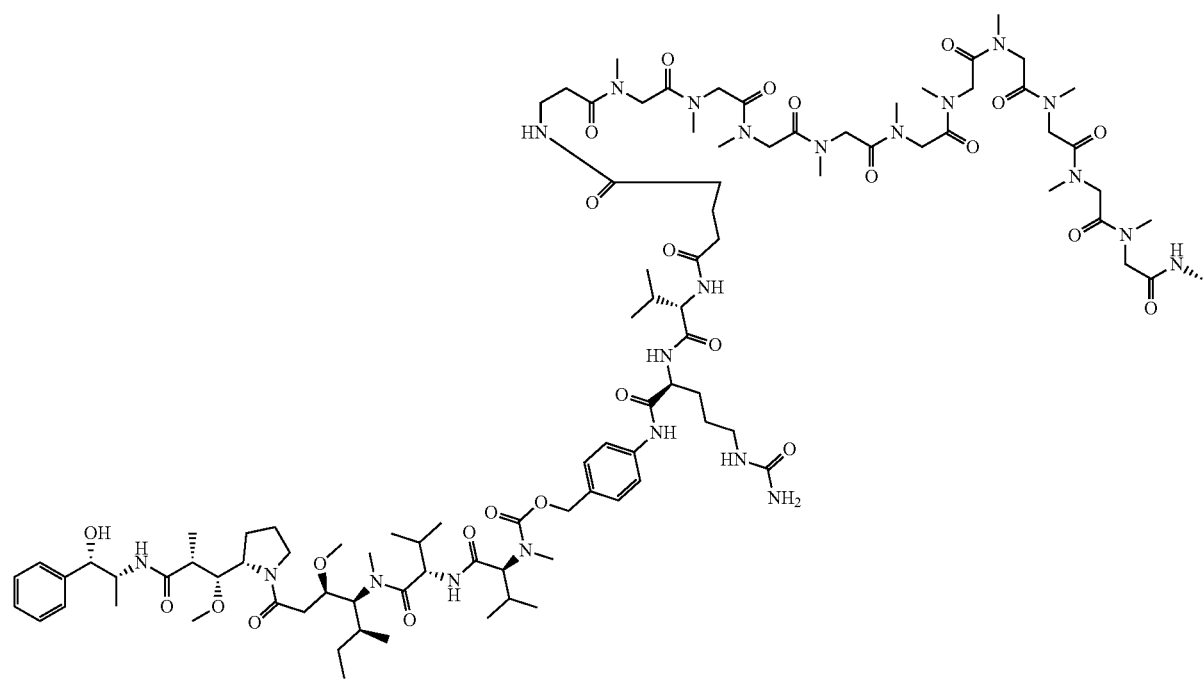

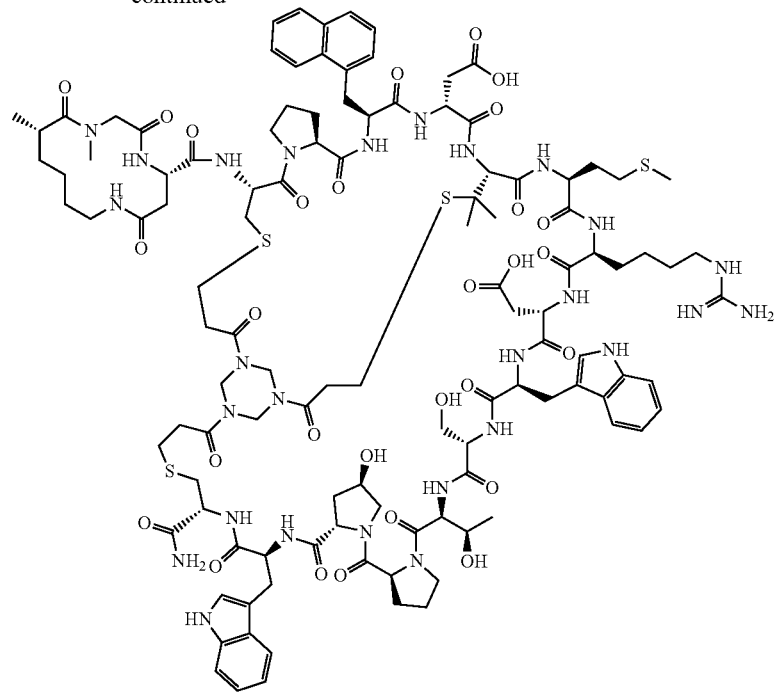
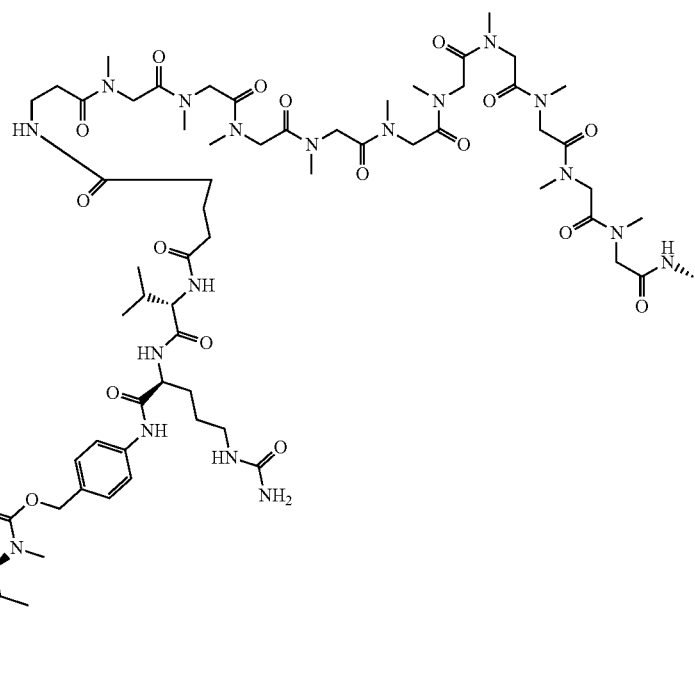

-continued
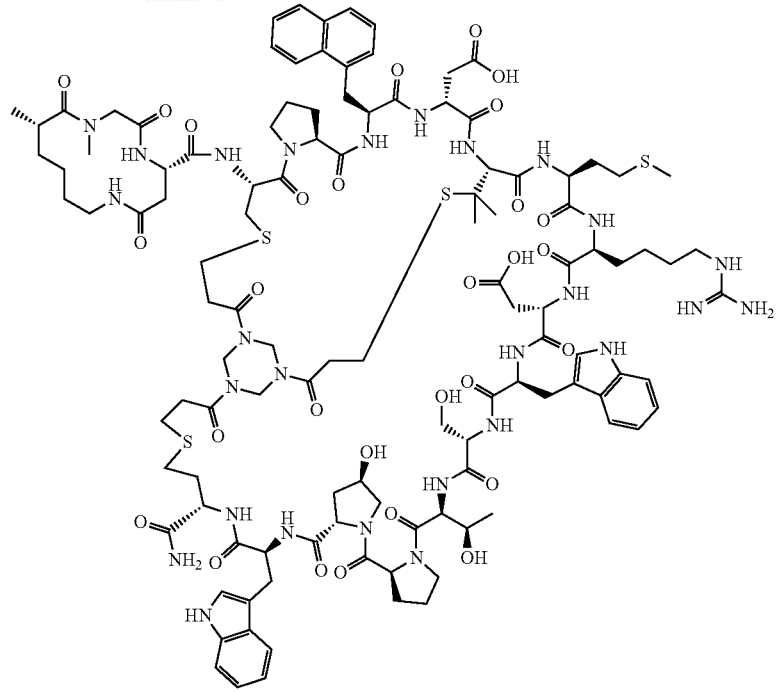
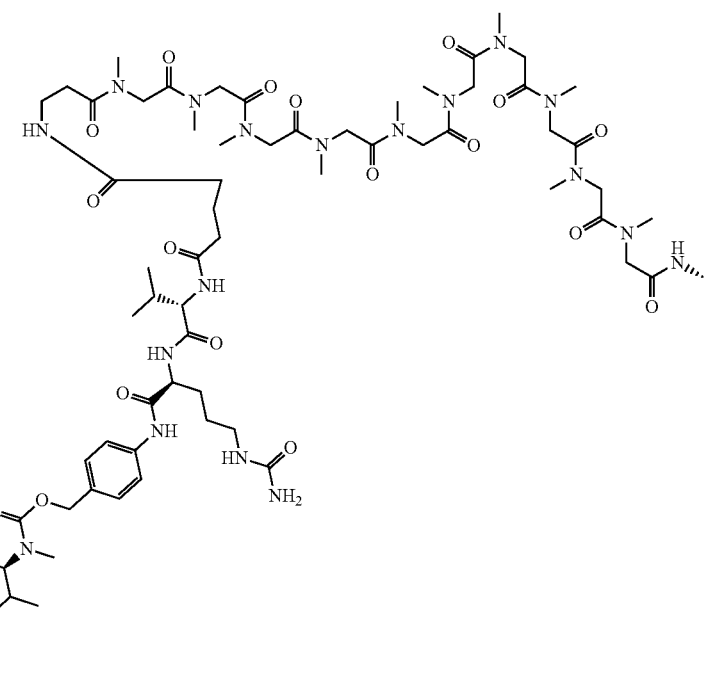

-continued
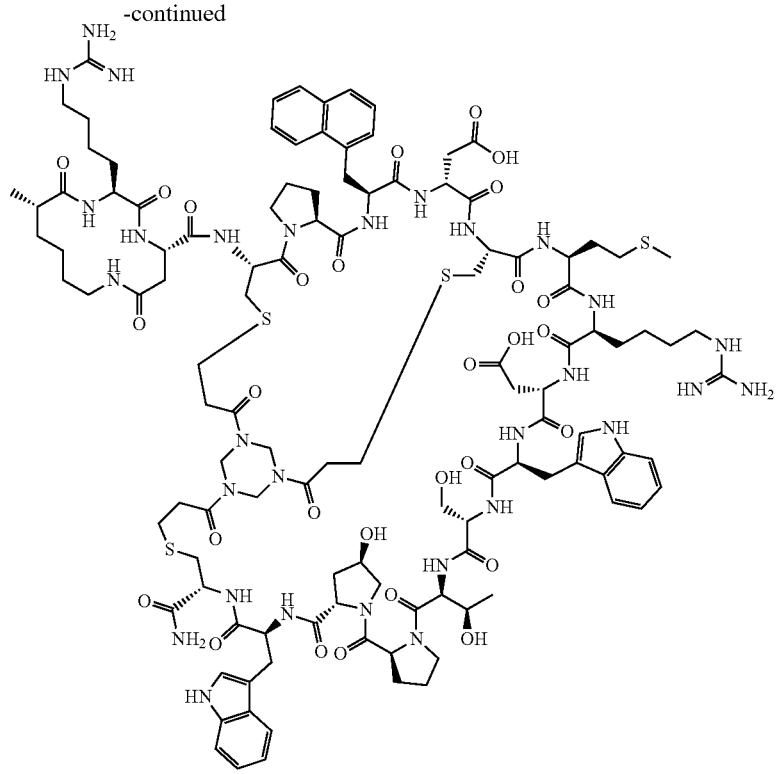

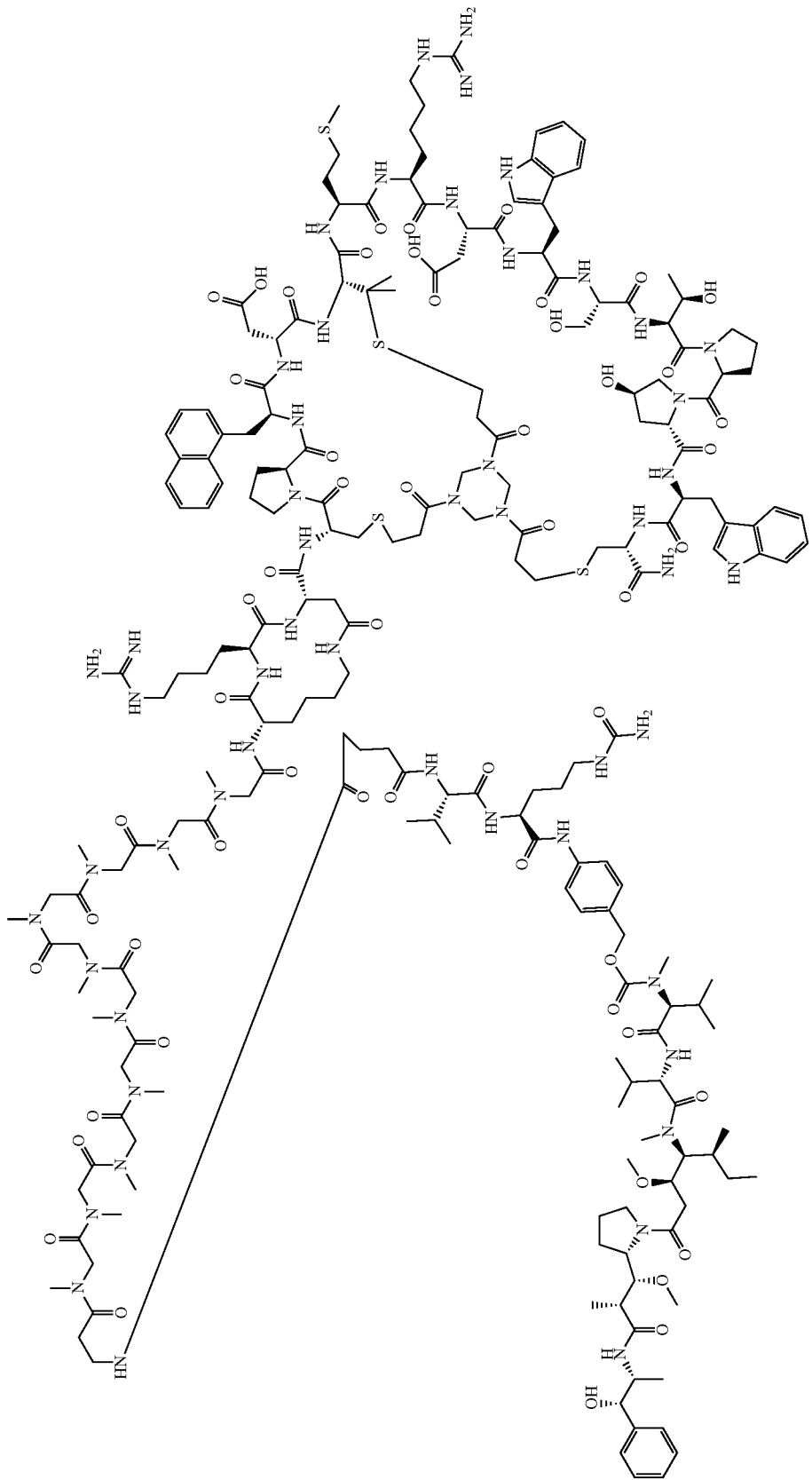

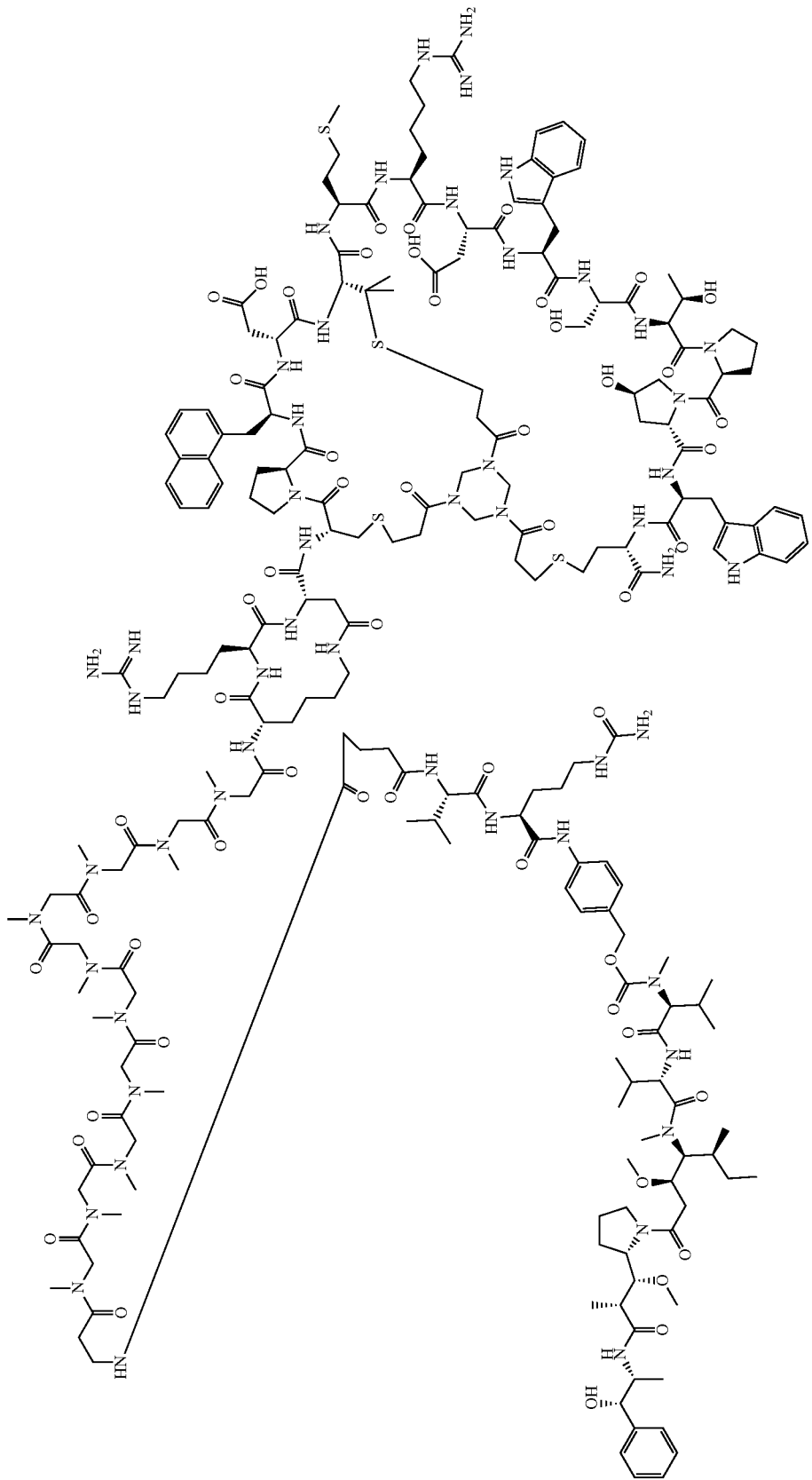

The present invention further provides a pharmaceutical composition comprising a therapeutically or prophylactically effective amount of the compounds and the pharmaceutically acceptable salts thereof of the present invention.

The present invention further provides the use of the compounds and the pharmaceutically acceptable salts thereof of the present invention and the pharmaceutical composition described above in preparation of a drug for treating Nectin-4 overexpressed solid tumors.

The present invention further provides the following preparation method:

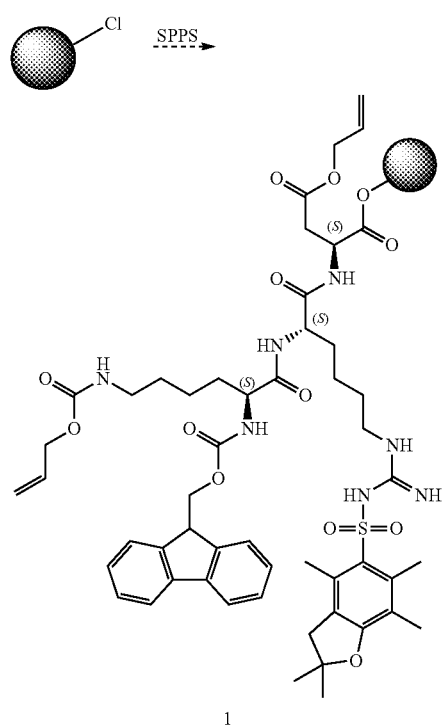

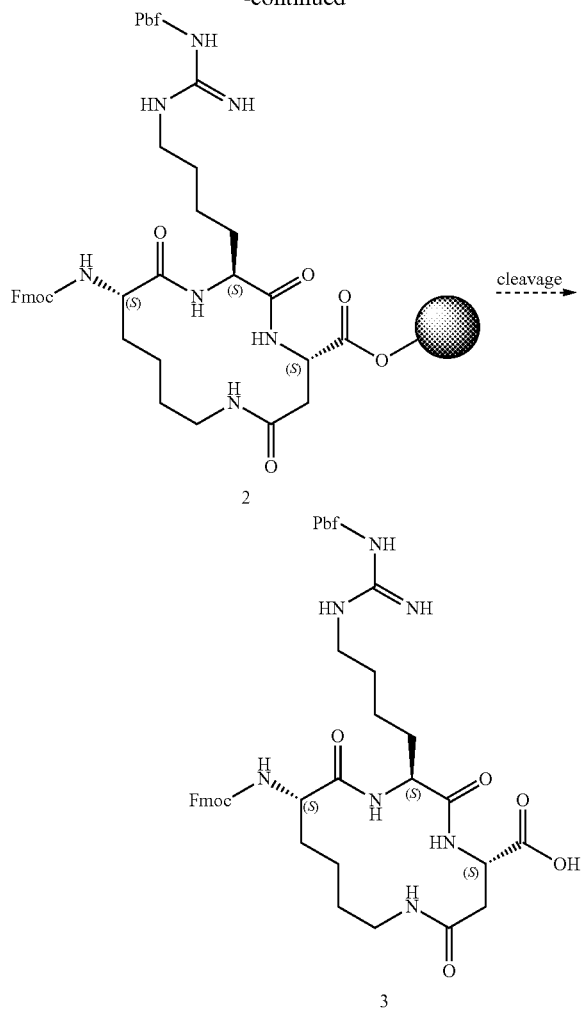

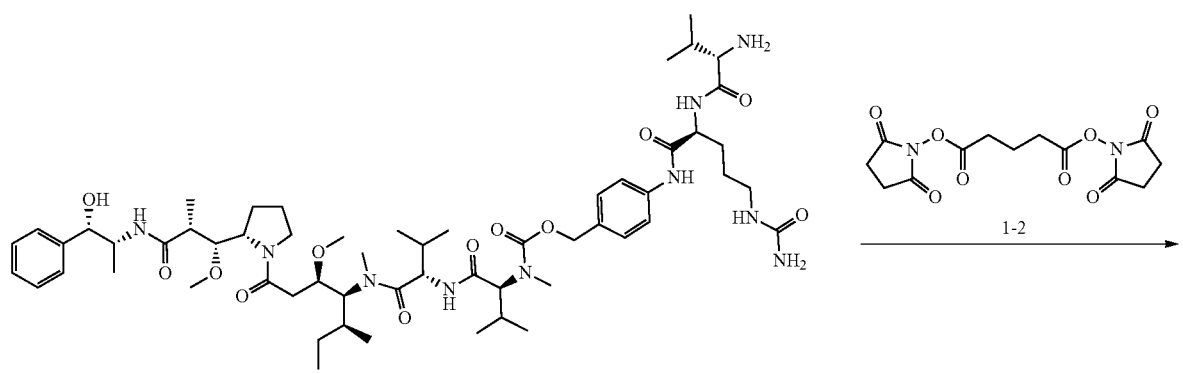

-continued
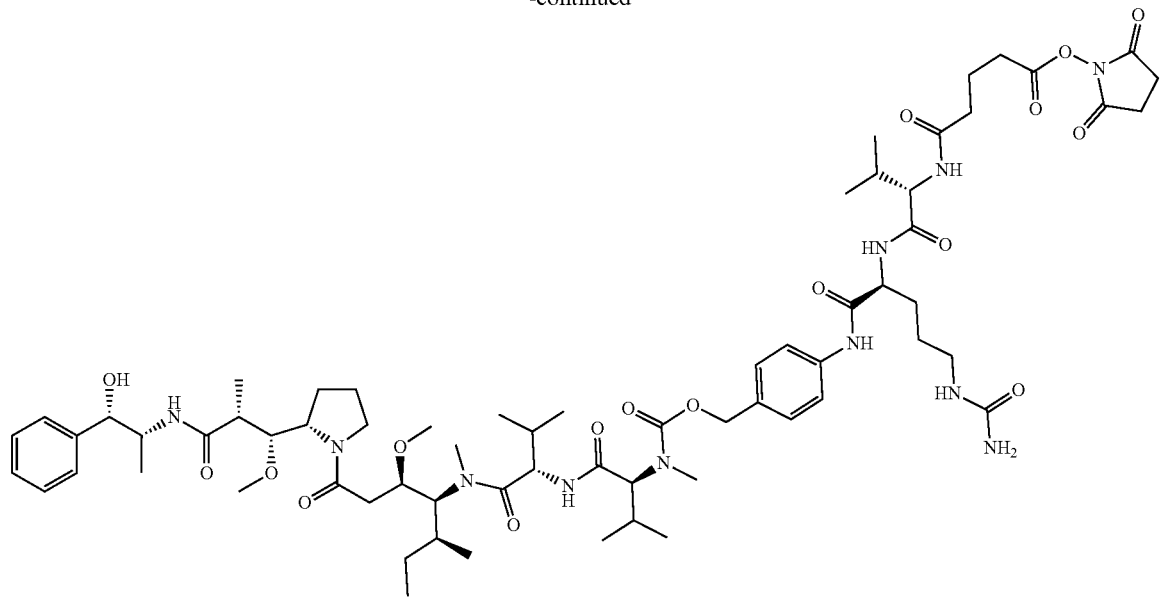
INT_1

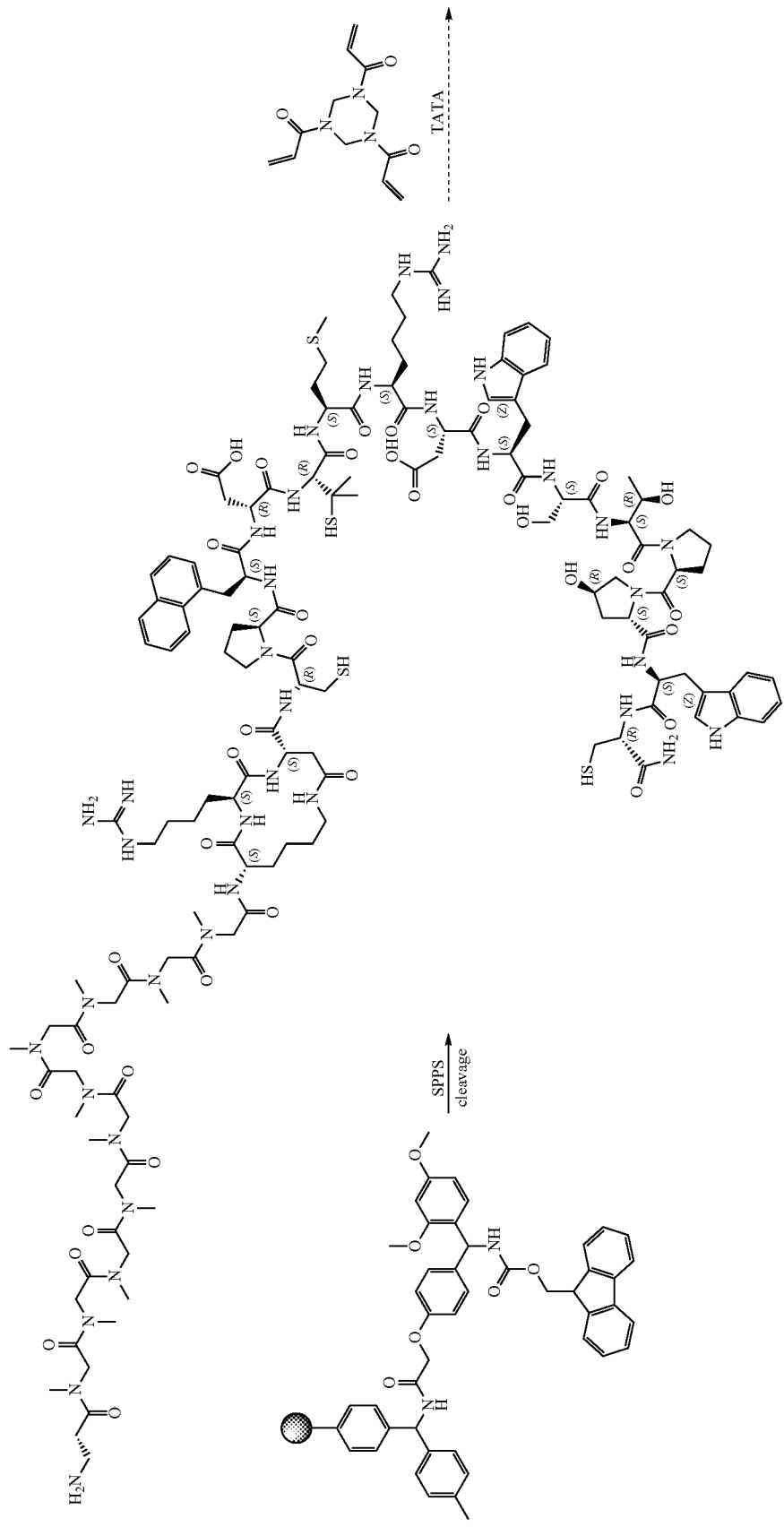

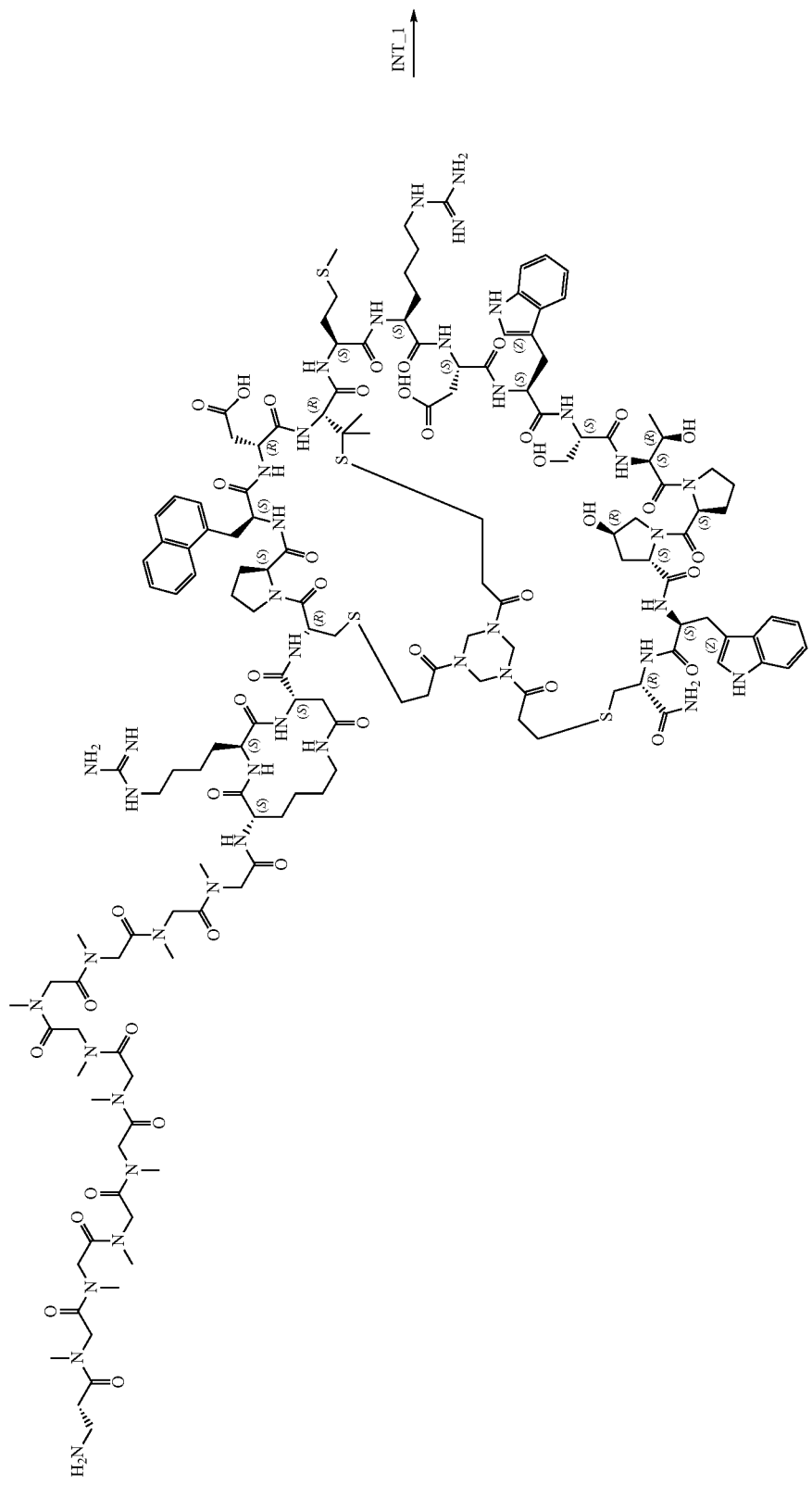

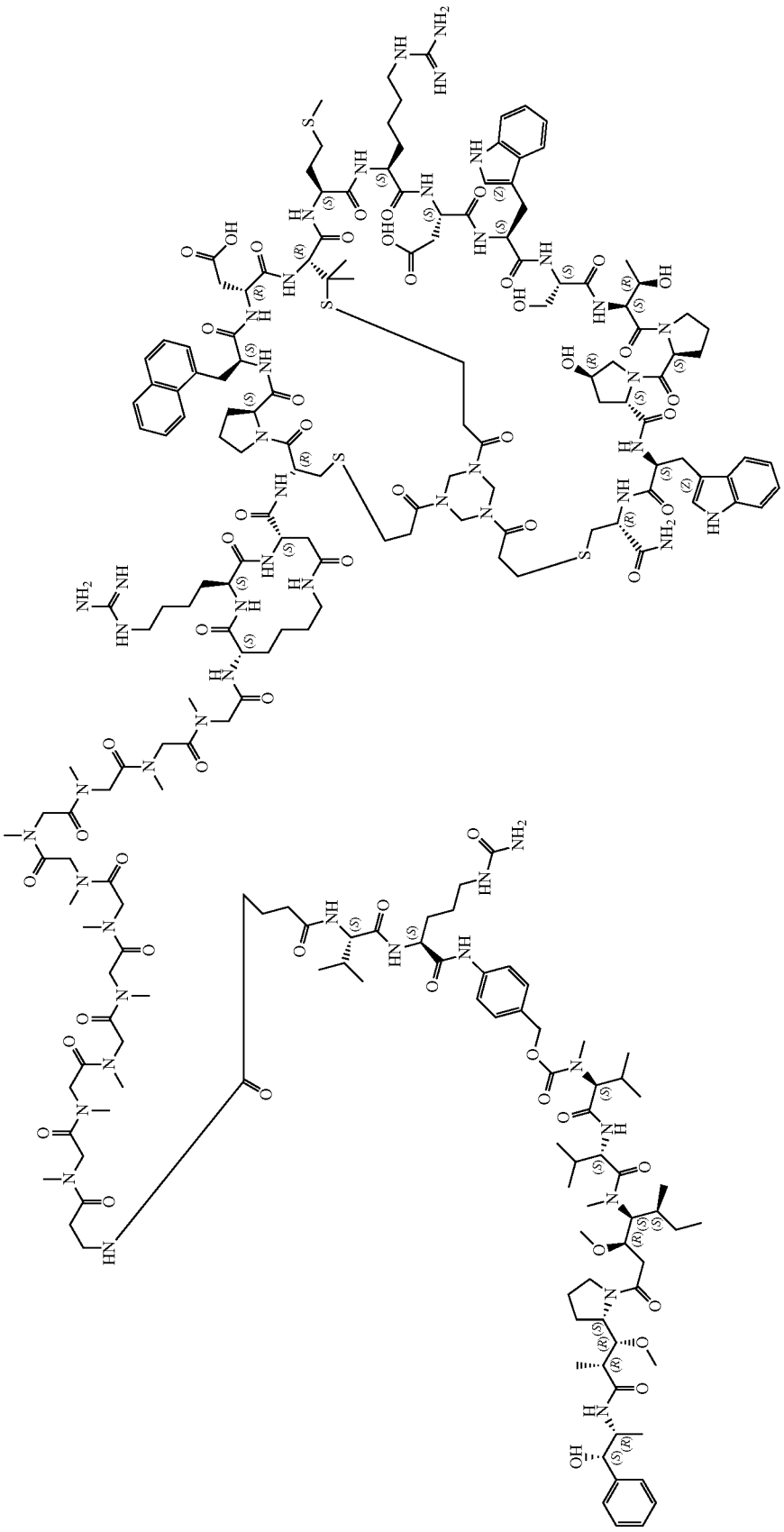

The present invention further provides the following test method.

Test Method 1. Binding Capacity Test of the Compounds of the Present Invention to Nectin-4 Protein 1. Experimental Purpose To test the affinity of the compound to be tested to the target protein Nectin-4 using the SPR method.

2. Materials and Instruments

Biacore 8K (GE Healthcare)
96-well Plate (Cat #650101, greiner bio-one)
CM5 chip (Cat #BR-1005-30, GE Healthcare)
Amine Coupling Kit (Cat #BR-1000-50, GE Healthcare)
  EDC
  NHS
  1 M ethanolamine
10 mM sodium acetate pH 4.5 (Cat #BR-1003-50, GE Healthcare)
DMSO (Cat #D4540, Sigma)
P20 (Cat #BR-1000-54, GE Healthcare)
PBS (Cat #BR-1006-72, GE Healthcare)
Nectin-4 (Cat #1006-72, GE Healthcare)

3. Experimental Protocol

In this experiment, the amino coupling method is used. The target protein Nectin-4 is directly immobilized on the CM5 chip using Biacore 8K. The compound to be tested as an analyte is then diluted to a required concentration gradient with a buffer (10 mM PBS, pH 7.4, 137 mM NaCl, 2.7 mM KCl, 5% DMSO, and 0.05% P20) for multi-cycle kinetic detection, in which each cycle is formed by 180 seconds of sample injection and 180 seconds of dissociation, and then the next cycle is performed, to obtain kinetic analysis data on the affinity of the target protein Nectin-4 to the compound to be tested. The final data are subjected to Kinetics fitting analysis based on a 1:1 model using Biacore Insight Evaluation Software (V 2.0.15.12933).

4. Experimental Method and Procedure

1) Preparation of the buffer: 10 mM PBS, pH 7.4, 137 mM NaCl, 2.7 mM KCl, 5% DMSO, and 0.05% P20.

2) Activation of the CM5 chip: The CM5 chip is activated with 400 mM EDC and 100 mM NHS at a flow rate of 10 μL/min for 420 seconds.

3) Coupling of the target protein: The target protein is diluted to 10 μg/mL with 10 mM sodium acetate (pH 4.5) and coupled at a flow rate of 10 μL/min for 284 s. The 1 #, 2 #, and 3 #channels on the chip are used in the experiment, and the coupling results are 1639.9RU, 1747.8RU, and 1702.2RU, respectively.

4) Blocking of the CM5 chip: The CM5 chip is blocked with 1 M ethanolamine at a flow rate of 10 μL/min for 420 seconds.

5) Analyte concentration: The compound to be tested is diluted with the buffer. The compound to be tested is diluted from 100 nM to 0.78 nM in a 2-fold gradient.

6) Sample injection analysis: Each concentration of the working solution of the compound to be tested corresponds to one cycle, with a flow rate of 30 μL/min for binding for 180 seconds and dissociating for 180 seconds. The last cycle is a 5% DMSO solvent correction cycle.

7) All results are subjected to kinetics fitting analysis based on a 1:1 model.

Technical Effect

The compounds of the present invention have a strong binding effect to Nectin-4 and a significant anti-tumor cell proliferation activity in vitro, exhibit a strong anti-tumor effect in a mouse subcutaneous tumor model in vivo, and have excellent in vitro metabolic stability and PK properties.

DEFINITION AND DESCRIPTION

Figure 1:
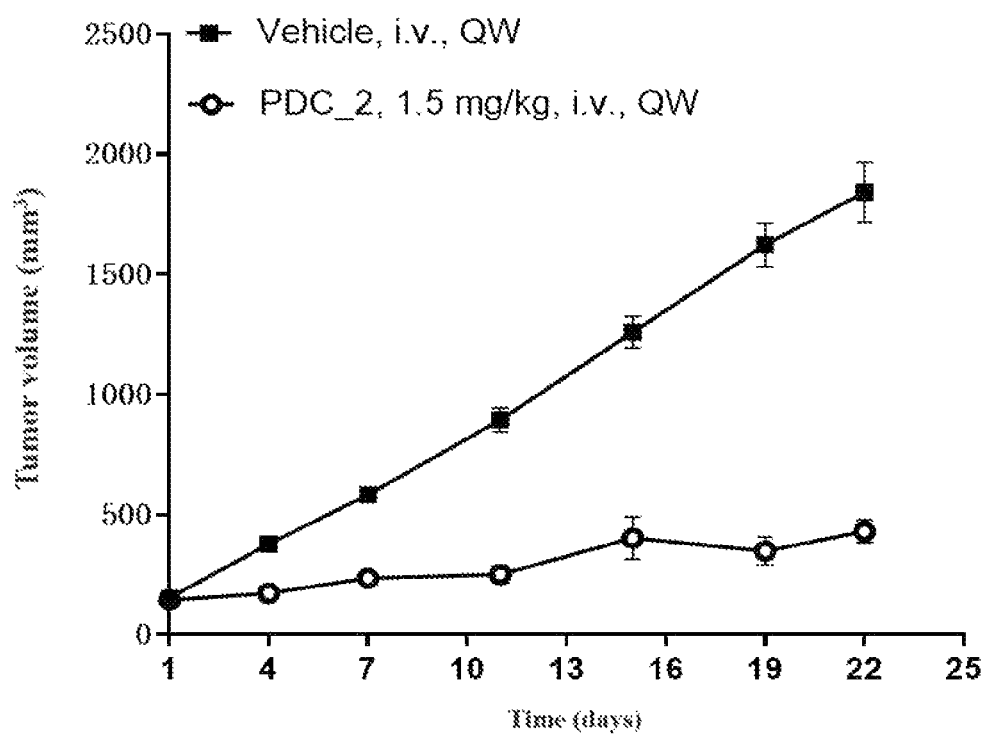
FIG. 1 shows a tumor growth curve of a compound of the present invention in a human lung cancer NCI-H292 cell subcutaneous xenograft tumor model.

Unless otherwise indicated, the following terms and phrases used herein are intended to have the following meanings. Unless specifically defined, a particular term or phrase should not be construed as indefinite or unclear but rather construed in a generic sense. When trade names appear herein, they are intended to refer to their corresponding goods or their active ingredients.

The term "pharmaceutically acceptable" used herein refers to those compounds, materials, compositions, and/or dosage forms that are, within the scope of sound medical judgment, suitable for use in contact with the tissues of humans and animals without undue toxicity, irritation, allergic response, or other problems or complications, commensurate with a reasonable benefit/risk ratio.

The term "pharmaceutically acceptable salt" refers to a salt of a compound of the present invention, prepared from the compound with the specified substituents found in the present invention and a relatively nontoxic acid or a base. When the compounds of the present invention contain relatively acid functional groups, base addition salts may be obtained by contacting such compounds with a sufficient amount of base in a neat solution or a suitable inert solvent. Pharmaceutically acceptable base addition salts include sodium, potassium, calcium, ammonium, organic amine, magnesium salts, or similar salts. When the compounds of the present invention contain relatively basic functional groups, acid addition salts may be obtained by contacting such compounds with a sufficient amount of acid in a neat solution or a suitable inert solvent. Certain specific compounds of the present invention contain basic and acid functional groups and thus can be converted to any base or acid addition salt.

The pharmaceutically acceptable salts of the present invention may be synthesized from a parent compound containing an acid radical or a basic group by conventional chemical methods. Generally, such salts are prepared by reacting these compounds in free acid or base form with a stoichiometric amount of appropriate base or acid in water, an organic solvent, or a mixture of both.

The term "pharmaceutically acceptable excipient" refers to an inert material that is administered together with an active ingredient and facilitates the administration of the active ingredient, including but not limited to any glidant, sweetening agent, diluent, preservative, dye/colorant, flavor enhancer, surface active agent, wetting agent, dispersing agent, disintegrant, suspending agent, stabilizer, isotonic agent, solvent, or emulsifier approved by the State Food and Drug Administration for use in humans or animals (e.g., domestic animals). Non-limiting examples of the excipient include calcium carbonate, calcium phosphate, various sugars and starches, cellulose derivatives, gelatin, vegetable oil, and polyethylene glycol.

The term "pharmaceutical composition" refers to a mixture of one or more compounds of the present invention or salts thereof with pharmaceutically acceptable excipients. The purpose of the pharmaceutical composition is to facilitate the administration of the compounds of the present invention to an organism.

The pharmaceutical composition of the present invention may be prepared by combining a compound of the present invention with suitable pharmaceutically acceptable excipients, for example, as solid, semi-solid, liquid, or gaseous formulations such as tablets, pills, capsules, powders, granules, ointments, emulsions, suspension agents, suppositories, injections, inhalants, gels, microspheres, aerosols, and the like.

The term "amino acid" refers to naturally occurring and synthetic amino acids, as well as amino acid analogs and amino acid mimetics that function similarly to naturally occurring amino acids. Naturally occurring amino acids are those encoded by the genetic code and those that have been later modified, such as hydroxyproline, gamma-carboxyglutamic acid, and O-phosphoserine. Amino acid analogs refer to compounds having the same basic chemical structure as naturally occurring amino acids (e.g., an alpha carbon bonded to a hydrogen, a carboxyl group, an amino group, and an R group), such as homoserine, norleucine, methionine sulfoxide, and methionine methylsulfonium. Such analogs may have modified R groups (e.g., norleucine) or modified peptide backbones but retain the same basic chemical structure as naturally occurring amino acids. The amino acid mimetics refer to chemical compounds that differ in structure from an amino acid's general chemical structure but function similarly to naturally occurring amino acids.

The amino acid sequences of the present invention contain standard one-letter or three-letter codes for the twenty natural amino acids.

The term "treating" includes inhibiting, slowing, stopping, or reversing the progression or severity of an existing symptom or condition.

The term "therapeutically effective amount" or "effective amount" means an amount of a compound of the present invention that achieves the following effects: (i) treating or preventing a particular disease, condition, or disorder, (ii) alleviating, ameliorating, or eliminating one or more symptoms of a particular disease, condition, or disorder, or (iii) preventing or delaying the onset of one or more symptoms of a particular disease, condition, or disorder described herein. In the case of cancer, a therapeutically effective amount of a drug may reduce the number of cancer cells, decrease tumor size, inhibit (i.e., slow and preferably stop to some extent) the infiltration of cancer cells into surrounding organs, inhibit (i.e., slow and preferably stop to some extent) tumor metastasis, inhibit tumor growth to some extent, and/or relieve one or more symptoms associated with cancer to some extent. To the extent that the drug may prevent the growth of existing cancer cells and/or kill existing cancer cells, it may be cytostatic and/or cytotoxic.

Unless otherwise indicated, the term "isomers" is meant to include geometric isomers, cis-trans isomers, stereoisomers, enantiomers, optical isomers, diastereomers, and tautomers.

The compounds of the present invention may exist in specific geometric or stereoisomeric forms. The present invention contemplates all such compounds, including cis and trans isomers, (−)- and (+)-enantiomers, (R)- and(S)-enantiomers, diastereomers, (D)-isomers, (L)-isomers, and racemic and other mixtures thereof, such as mixtures enriched with enantiomers or diastereomers, all of which are within the scope of the present invention. Additional asymmetric carbon atoms may be present in substituents such as an alkyl group. All such isomers and mixtures thereof are included within the scope of the present invention.

Unless otherwise indicated, the term "enantiomers" or "optical isomers" refers to stereoisomers that are mirror images of one another.

Unless otherwise indicated, the term "cis-trans isomers" or "geometric isomers" results from the inability of a double bond or a single bond of a ring-forming carbon atom to rotate freely.

Unless otherwise indicated, the term "diastereomer" refers to stereoisomers in which the molecules have two or more chiral centers and are not mirror images of each other.

Unless otherwise indicated, "(+)" means dextrorotatory, "(−)" means levorotatory, and "(+)" means racemic.

Unless otherwise indicated, the absolute configuration of a stereocenter is represented by wedge-shaped solid bonds ( ◢ ) and wedge-shaped dashed bonds ( ◌ ), and the relative configuration of the stereocenter is represented by straight solid bonds ( ◢ ) and straight dashed bonds ( ◌ ) the wedge-shaped solid bonds ( ◢ ) or the wedge-shaped dashed bonds ( ◌ ) is represented by wavy lines ( ∼ ), or the straight solid bonds ( ◢ ) or the straight dashed bonds ( ◌ ) is represented by wavy lines ( ∼ ).

Unless otherwise indicated, the terms "enriched in one isomer," "isomerically enriched," "enriched in one enantiomer," or "enantiomerically enriched" mean that one isomer or enantiomer is present in less than 100% and greater than or equal to 60%, or greater than or equal to 70%, or greater than or equal to 80%, or greater than or equal to 90%, or greater than or equal to 95%, or greater than or equal to 96%, or greater than or equal to 97%, or greater than or equal to 98%, or greater than or equal to 99%, or greater than or equal to 99.5%, or greater than or equal to 99.6%, or greater than or equal to 99.7%, or greater than or equal to 99.8%, or greater than or equal to 99.9%.

Unless otherwise indicated, the term "isomer excess" or "enantiomeric excess" refers to the difference between the relative percentages of two isomers or two enantiomers. For example, where one isomer or enantiomer is present in 90% and the other isomer or enantiomer is present in 10%, the isomer or enantiomer excess (ee value) is 80%.

Optically active (R)- and (S)-isomers, as well as D) and L isomers, may be prepared by chiral synthesis, chiral reagents, or other conventional techniques. A desired enantiomer of a compound of the present invention may be prepared by asymmetric synthesis or derivatization with chiral auxiliary agents in which the resulting diastereomeric mixture is separated and the auxiliary group is cleaved to provide the pure desired enantiomer. Alternatively, when the molecule contains a basic functional group, such as an amino group, or an acid functional group, such as a carboxyl group, a diastereomeric salt is formed with an appropriate optically active acid or base, followed by diastereomeric resolution by conventional methods well known in the art, followed by recovery to obtain the pure enantiomer. In addition, the enantiomers and diastereomers are typically separated using chromatography employing a chiral stationary phase, optionally in combination with chemical derivatization (e.g., carbamate formation from an amine).

The compounds of the present invention may contain unnatural proportions of atomic isotopes on one or more atoms constituting the compounds. For example, the compounds may be labeled with radioisotopes, such as tritium ($^3H$), iodine-125 ($^{125}I$), or C-14 ($^{14}C$). Also, for example, a deuterated drug may be formed by replacing hydrogen with deuterium, wherein the bond formed between deuterium and carbon is stronger than that formed between ordinary hydrogen and carbon, and the deuterated drug has the advantages of reduced toxic side effects, increased drug stability, enhanced therapeutic efficacy, and prolonged biological half-life, compared with the undeuterated drug. All isotopic variations of the compounds of the present invention, whether radioactive or not, are included within the scope of the present invention.

When the attachment group listed does not indicate the attachment direction thereof, the attachment direction is arbitrary. For example

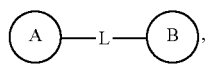

when the attachment group L is -M-W-, the -M-W- may be attached to ring A and ring B in the same direction as the reading order from left to right to form

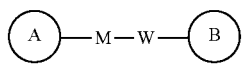

or may be attached to ring A and ring B in the opposite direction as the reading order from left to right to form

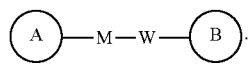

Combinations of the attachment group, the substituents, and/or variants thereof are permissible only if such combinations result in stable compounds.

Unless otherwise specified, when a group has one or more attachable sites, any one or more of the sites of the group may be attached to other groups by chemical bonds. When the chemical bonds are attached in a non-positional manner and there are H atoms at the attachable sites, then the number of H atoms at the sites will correspondingly decrease as a function of the number of attached chemical bonds to become a group of corresponding valence when the chemical bonds are attached. The chemical bonds attaching the sites to other groups may be represented by straight solid bonds ( ∕ ) straight dashed bonds ( ∕ ), or wavy lines

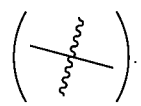

For example, the straight solid bond in-OCH; represents the attachment to another group through the oxygen atom of the group; the straight dashed bonds in

represent the attachment to other groups through both ends of the nitrogen atom of the group; the wavy lines in

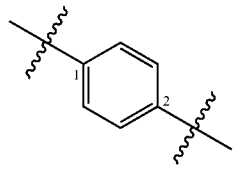 [SMILES: *c1ccc(*)cc1]

represent the attachment to other groups through the carbon atoms of the phenyl group at position 1 and 2.

Unless otherwise specified, the term "$C_{1-4}$ alkyl" represents a straight or branched saturated hydrocarbon group consisting of 1 to 4 carbon atoms. The $C_{1-4}$ alkyl includes $C_{1-2}$ alkyl, $C_{1-3}$ alkyl, $C_{2-3}$ alkyl, and the like, which may be monovalent (e.g., methyl), divalent (e.g., methylene), or polyvalent (e.g., methine). Examples of $C_{1-4}$ alkyl groups include, but are not limited to, methyl (Me), ethyl (Et), propyl (including n-propyl and isopropyl), butyl (including n-butyl, isobutyl, s-butyl, and t-butyl), and the like.

Unless otherwise specified, the term "$C_{1-3}$ alkyl" represents a straight or branched saturated hydrocarbon group consisting of 1 to 3 carbon atoms. The $C_{1-3}$ alkyl includes $C_{1-2}$ alkyl, $C_{2-3}$ alkyl, and the like, which may be monovalent (e.g., methyl), divalent (e.g., methylene), or polyvalent (e.g., methine). Examples of $C_{1-3}$ alkyl groups include, but are not limited to, methyl (Me), ethyl (Et), propyl (including n-propyl and isopropyl), and the like.

Unless otherwise indicated, amino acids Xi, Xii, and Xiii in the present invention are attached to TATA through the thiol group on the residue. For example, when Xi is Pen,

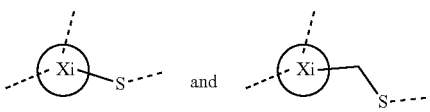

both represent

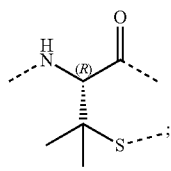

when Xi is Cys,

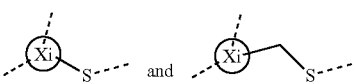

both represent

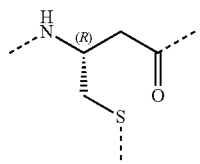

The compounds of the present invention may be structurally confirmed by conventional methods well known to those skilled in the art. If the present invention relates to the absolute configuration of the compounds, the absolute configuration may be confirmed by conventional technical means in the art. For example, for single crystal X-ray diffractometry (SXRD), the diffraction intensity data of the cultured single crystal is collected using Bruker D8 venture diffractometer, with a CuKα radiation as light source and a φ/ω scanning mode, and the absolute configuration may be confirmed by further resolving the crystal structure using a direct method (Shelxs97) after collecting relevant data.

The compounds of the present invention may be prepared by various synthetic methods well known to those skilled in the art, including the specific embodiments set forth below, embodiments formed in combination with other chemical synthetic methods, and equivalents well known to those skilled in the art. Preferred embodiments include, but are not limited to, the examples of the present invention.

The compounds are named according to conventional nomenclature in the art or using ChemDraw® software, and the commercially available compounds adopt the name in the supplier catalog.

The solvent used in the present invention is commercially available. The proportion of mixed solvents appearing in the present invention is a volume ratio. For example, 20% MeCN/H$_2$O means that the volume of MeCN in the mixed solvent accounts for 20%.

The following abbreviations are used in the present invention: eq. for equivalent; SPPS for polypeptide solid phase synthesis; TFA for trifluoroacetic acid; DIEA for diisopropylethyl amine; DMF for N,N-dimethylformamide; HATU for 2-(7-azabenzotriazole)-N,N,N',N'-tetramethyluronium hexafluorophosphate; EDC for 1-(3-dimethylaminopropyl)-3-ethylcarbodiimide hydrochloride; NHS for N-hydroxysuccinimide; TIS for triisopropylsilane; DTT for DL-1,4-dithiothreitol; TATA for

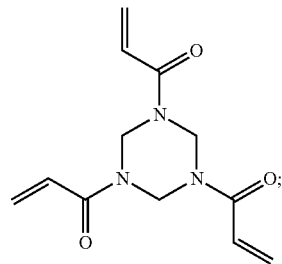 [SMILES: C=CC(=O)N1CN(C(=O)C=C)CN(C(=O)C=C)C1]

MMAE for monomethyl auristatin E, with a structure of

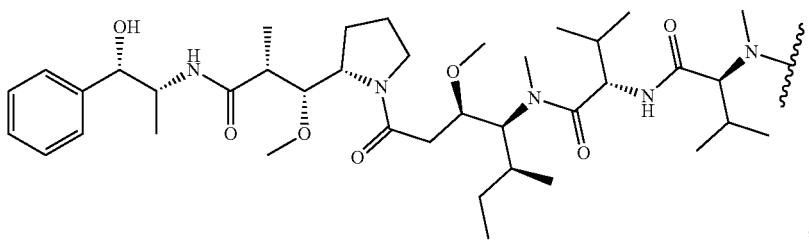

PABC for

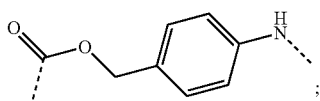

Cit for L-citrulline; Val for L-valine; Glutaryl for

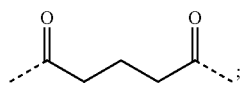

β-Ala for

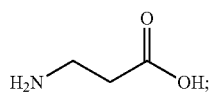

Sar for

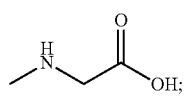

Sar10 for

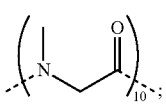

Cys for L-cysteine; hCys for

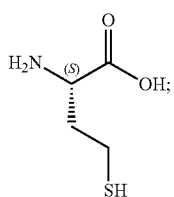

βCys for

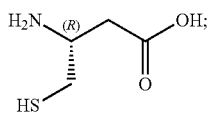

Pen for

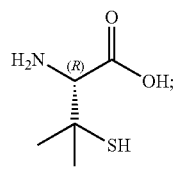

N-methyl-Dap for

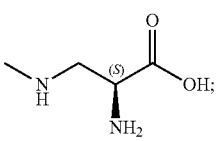

1Nal for 1-naphthylalanine; hArg for L-homoarginine; Hyp for L-hydroxyproline; Trp for L-tryptophan; Pro for L-proline; Thr for L-threonine; Ser for L-serine; Asp for L-aspartic acid; dAsp for D-aspartic acid; Fmoc for 9-fluorenylmethyloxycarbonyl; Boc for tert-butoxycarbonyl (Boc); Trt for trityl; Pbf for 2,2,4,6,7-pentamethyldihydrobenzofuran-5-sulfonyl; and PBS for phosphate buffer.

DETAILED DESCRIPTION OF THE EMBODIMENTS

The following examples describe the present invention in detail, but they are not meant to impose any unfavorable limitation on the present invention. The present invention has been described in detail herein, and its specific embodiments are also disclosed. It will be apparent to those skilled in the art that various changes and modifications can be made to the specific embodiments without departing from the spirit and scope of the present invention.

EXAMPLE 1

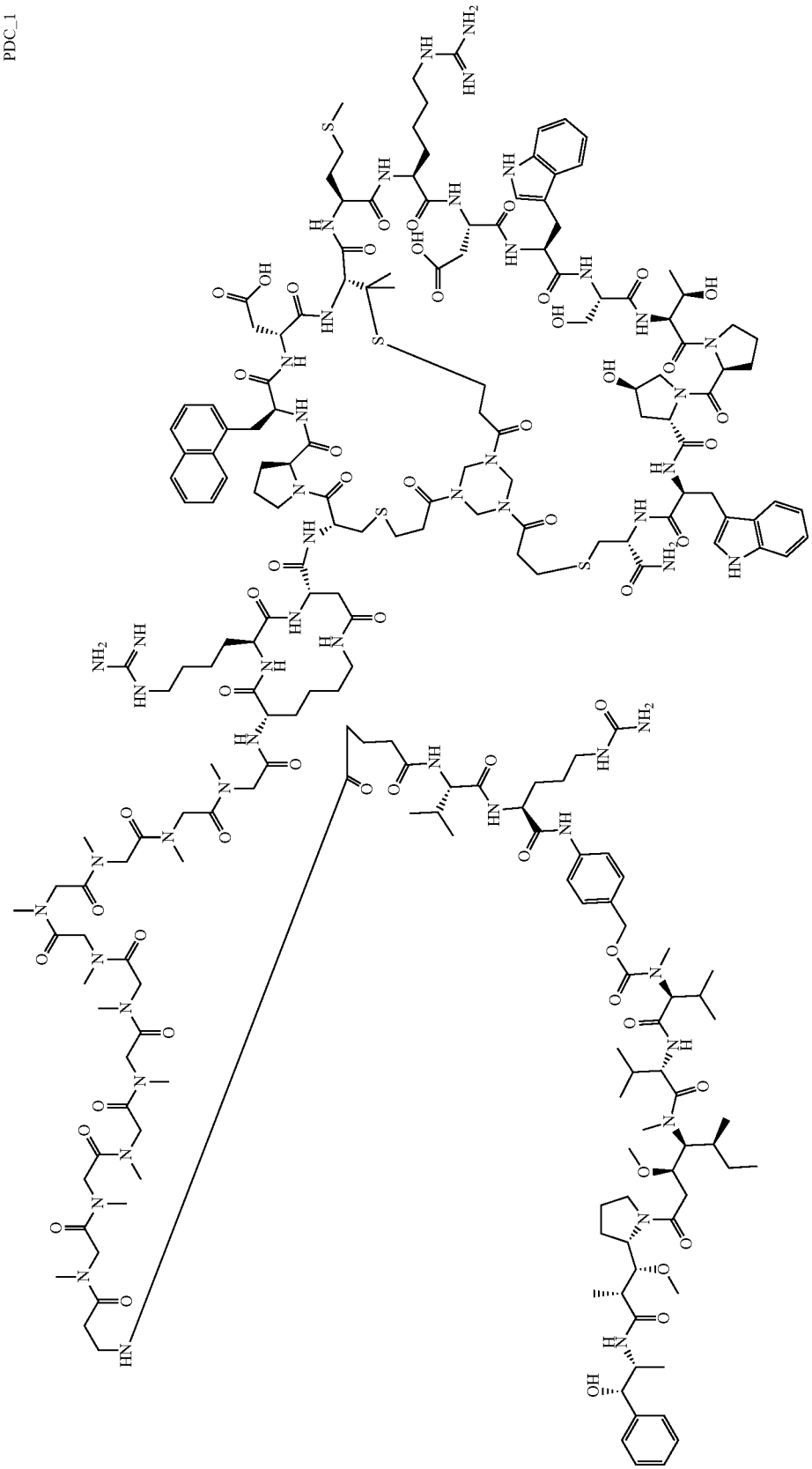

Synthetic Route:
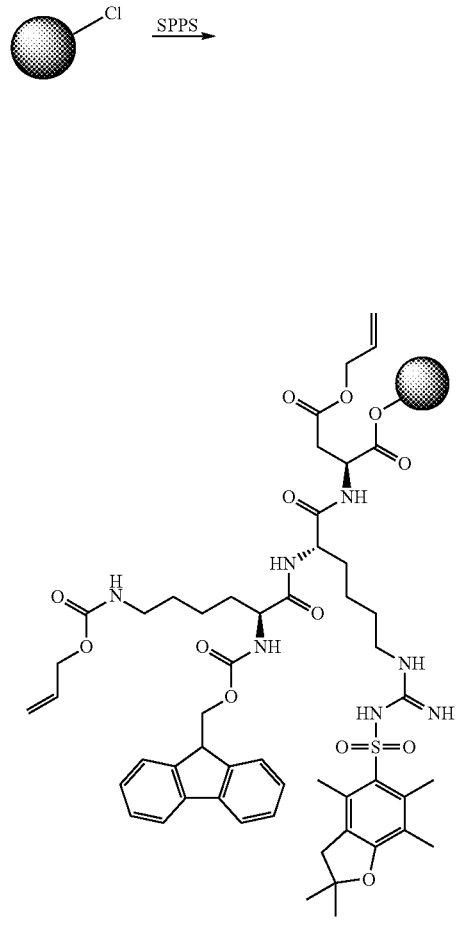
1
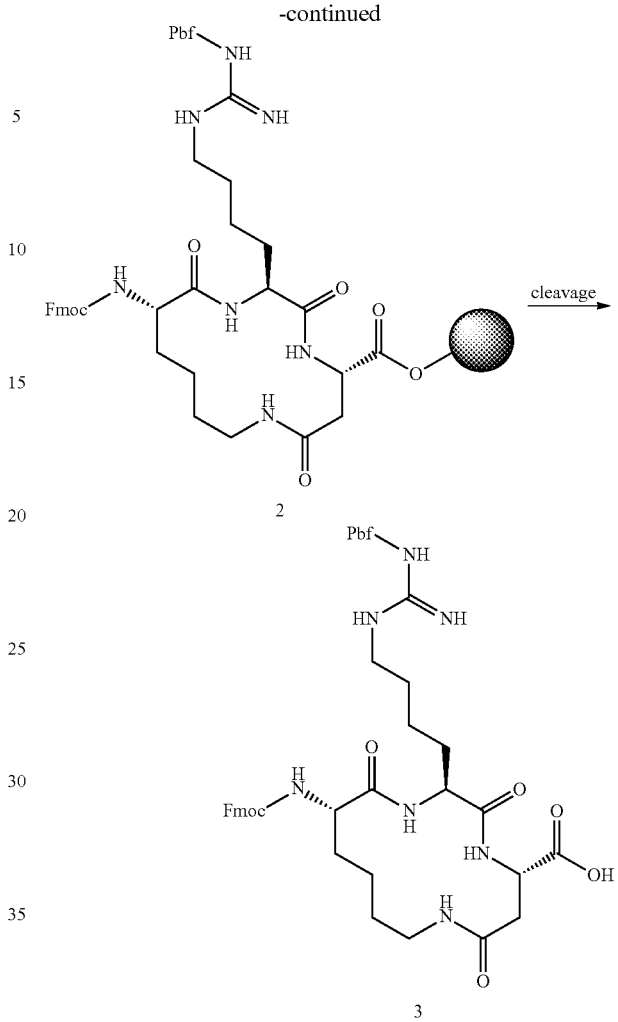
3
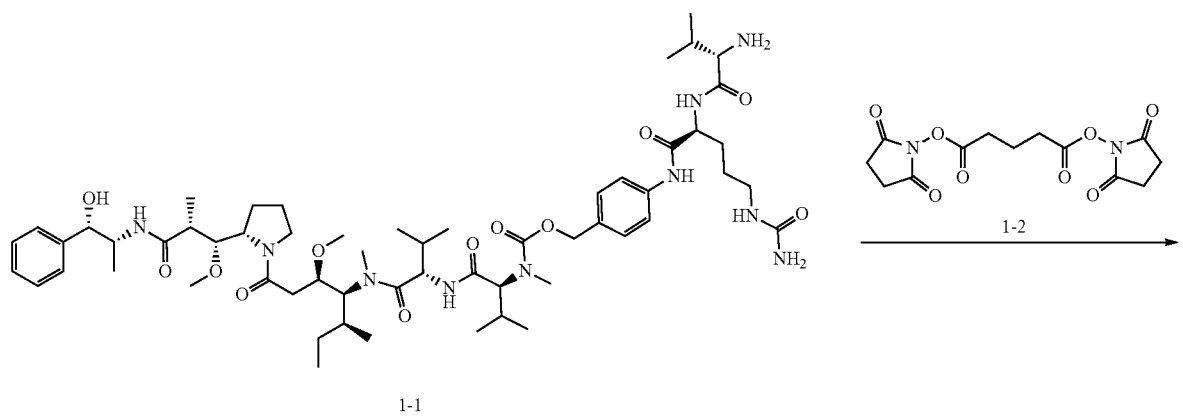
1-1

-continued
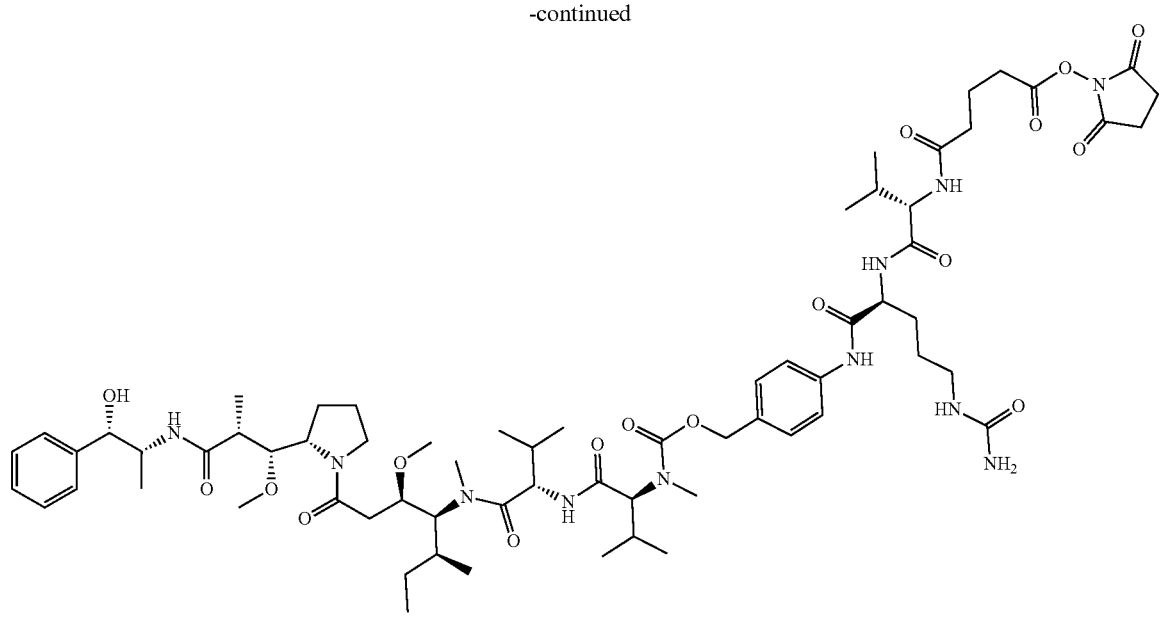
INT_1

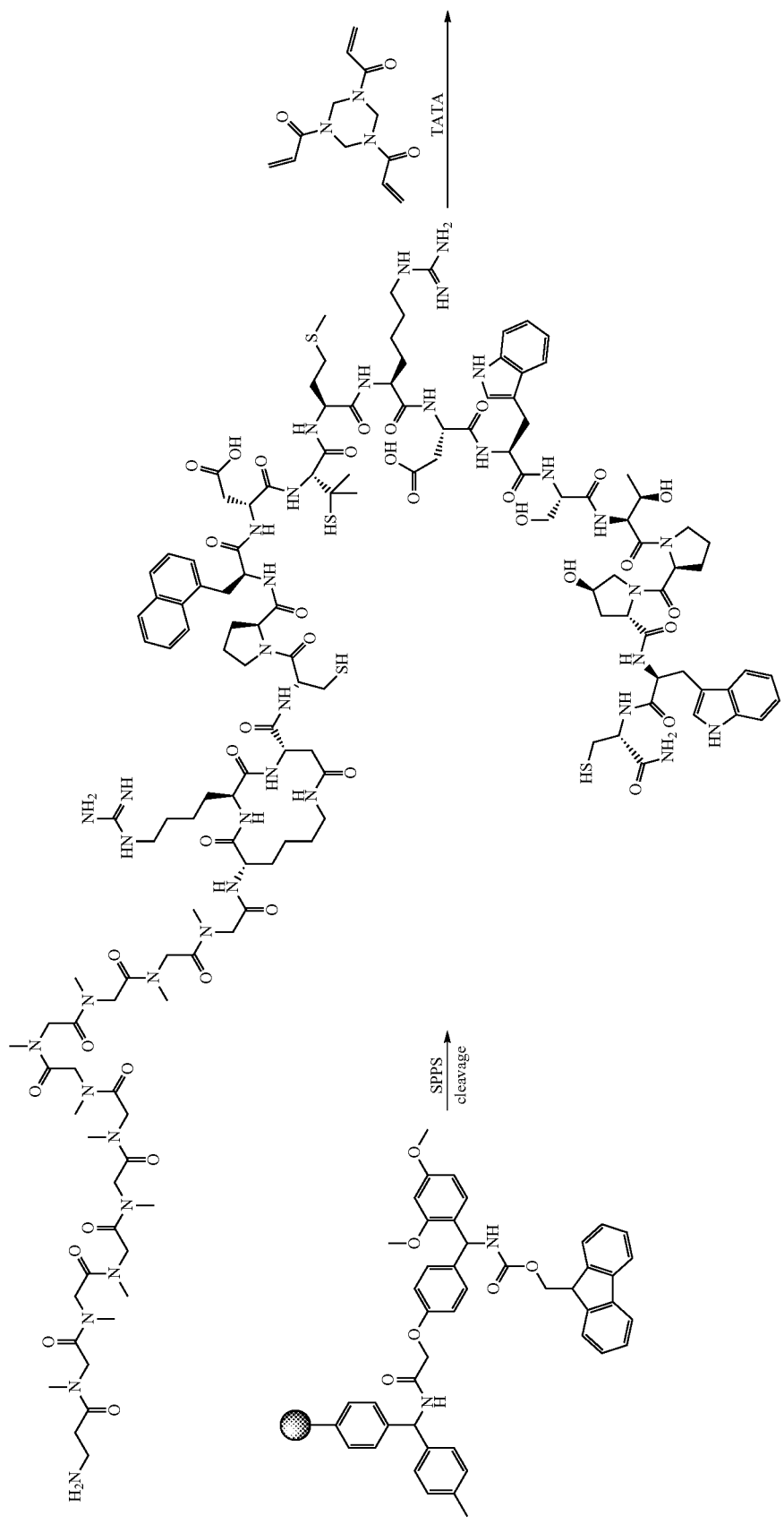

-continued
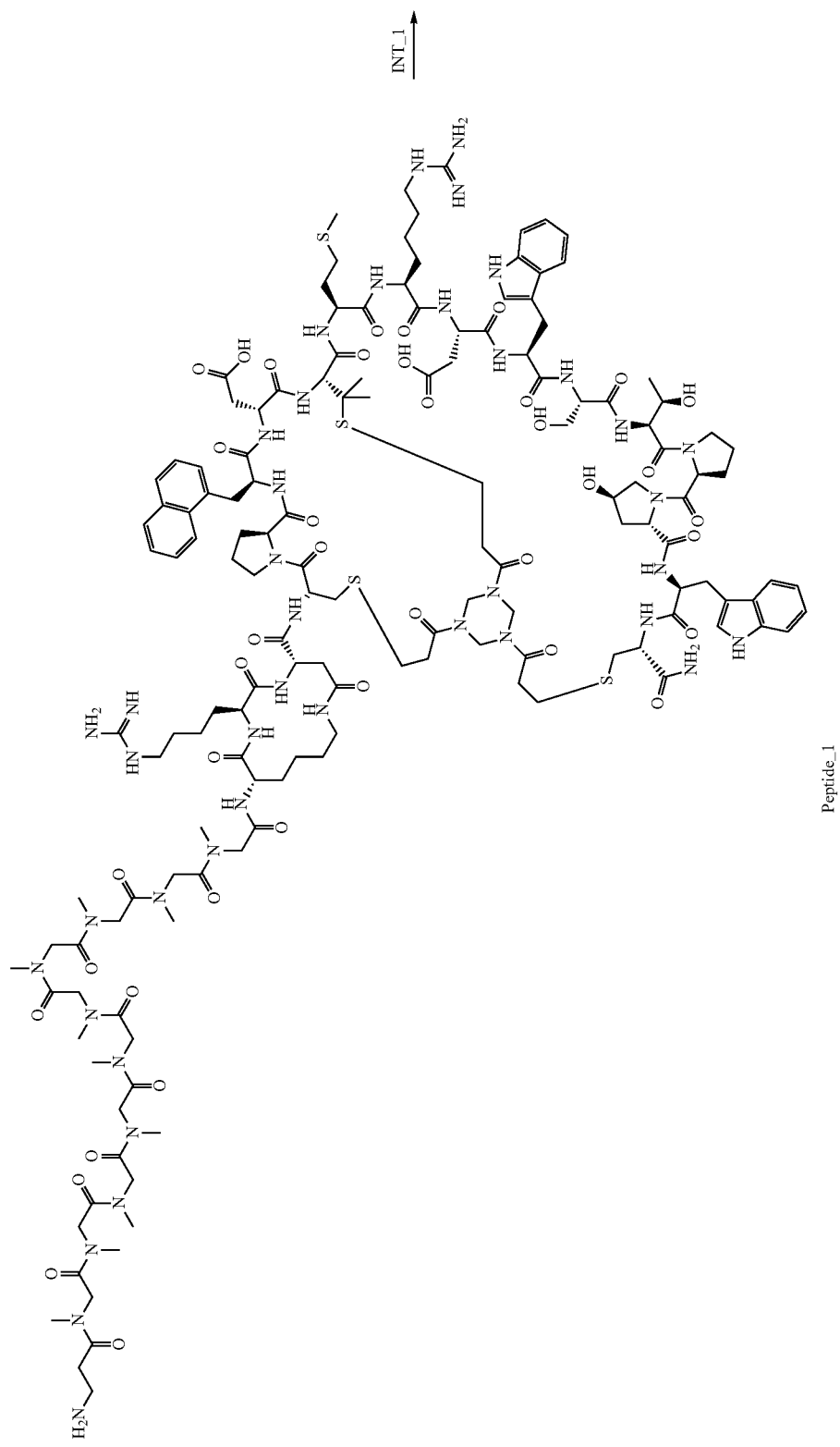
Peptide_1

-continued
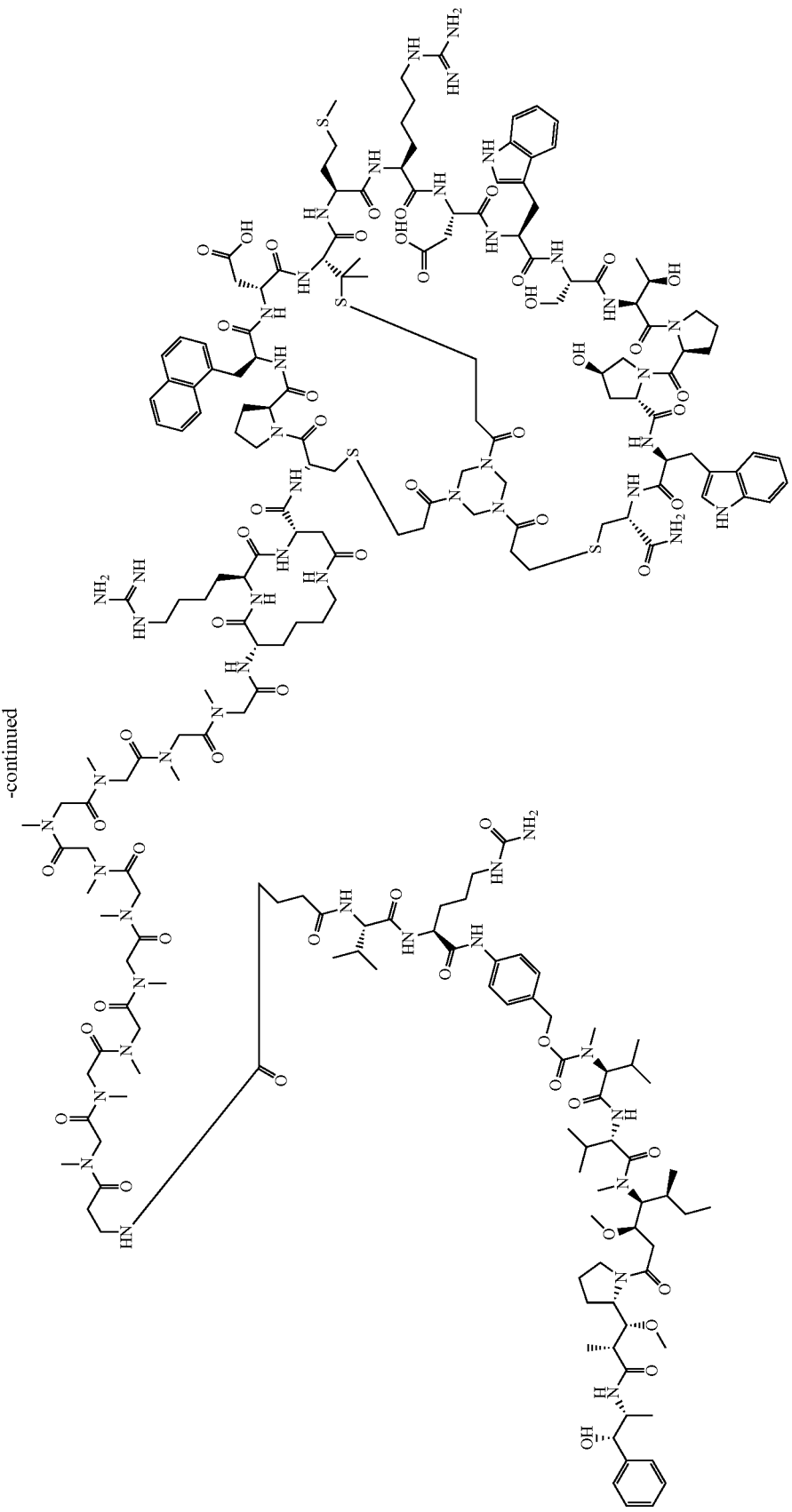
PDC_1

1. Synthesis of Compound 3

Polypeptide Synthesis:

The polypeptide was synthesized using the standard stepwise synthesis method.

1) DCM was added to a container containing CTC Resin (10.0 mmol, 10 g, with 1.0 mmol/g of a substrate) and Fmoc-Asp (OAll)-OH (3.95 g, 10.0 mmol, 1.0 eq).

2) DIEA (4.0 eq) was added and stirred for 2 hours.

3) MeOH (0.3 mL) was added and stirred for 30 min.

4) The obtained mixture was drained and then rinsed three times with DMF, with nitrogen sparging for 30 seconds each time.

5) A 20% piperidine/DMF was added, and then the system reacted for 30 min.

6) The obtained mixture was drained and then rinsed five times with DMF, with nitrogen sparging for 30 seconds each time.

7) A next Fmoc-protected amino acid solution was added for 30 seconds, followed by a condensing agent, and the system reacted under $N_2$ sparging for approximately 1 hour.

8) Steps 4 to 7 were repeated to condense the next amino acid until the Fmoc-Lys (Alloc)-OH attachment was completed. The addition order of amino acids and condensing agents used to synthesize compound 3 is shown in Table 1.

9) The obtained mixture was drained and then rinsed three times with DMF and three times with DCM, with nitrogen sparging for 30 seconds each time.

10) De-OAll and Alloc: Pd (PPh3) 4 (0.1 eq) and PhSiH3 (10.0 eq) were added to the DCM resin solution, and the system reacted under $N_2$ sparging for approximately 15 minutes and drained. This step was repeated three times.

11) The obtained mixture was drained and then rinsed five times with DMF, with nitrogen sparging for 30 seconds each time.

12) Cyclization: The condensing agent solution HATU (2.85 eq.) and DIEA (6.0 eq.) were added, and the system reacted under $N_2$ sparging for approximately 1 hour.

13) The obtained mixture was drained and then rinsed three times with DMF and three times with methanol, with nitrogen sparging for 30 seconds each time, and drained and dried.

TABLE 1

Addition order

| # | Raw material | Condensing agent |
|---|---|---|
| 1 | Fmoc-Asp(OAll)-OH (1.0 eq.) | DIEA (4.0 eq.) |
| 2 | Fmoc-hArg(Pbf)-OH (3.0 eq.) | HBTU (2.85 eq.) and DIEA (6.0 eq.) |
| 3 | Fmoc-Lys(Alloc)-OH (3.0 eq.) | HATU (2.85 eq.) and DIEA (6.0 eq.) |

Cleavage and Purification:

A cleavage buffer (20% HFIP/DCM) was added to a flask containing the side chain-protected polypeptide and stirred at room temperature for 30 minutes×2 times. The solution was collected and spun to dry, purified by reverse phase preparation ($NH_4HCO_3$ system), and lyophilized to give intermediate 3.

TABLE 2

| Purification conditions | |
|---|---|
| Separation conditions | |
| Dissolution condition | Dissolved in DMF |
| Machine model | AUNO DAC-100 |
| Mobile phase | A: $H_2O$ (10.0 mM $NH_4HCO_3/H_2O$) B $CH_3CN$ |
| Separation gradient | 30-70%-40 min, retention time: 20 min |
| Column type | Welch Xtimate ®C18, 250*50 mm, 10 μm, 120 Å |
| Flow rate | 250 mL/min |
| Wavelength | 214/254 nm |
| Temperature | 25° C. |

2. Synthesis of a TFA Salt of Compound 4

The polypeptide was synthesized using the standard stepwise synthesis method.

1) DMF was added to a container containing Rink amide MBHA resin (0.5 mmol, 1.56 g, with 0.32 mmol/g of a substrate), and the resin was allowed to swell for 2 hours.

2) The obtained mixture was drained and then rinsed three times with DMF, with nitrogen sparging for 30 seconds each time.

3) A 20% piperidine/DMF was added, and then the system reacted for 30 min.

4) The obtained mixture was drained and then rinsed five times with DMF, with nitrogen sparging for 30 seconds each time.

5) A Fmoc-protected amino acid solution d was added for 30 seconds, followed by a condensing agent, and the system reacted under $N_2$ sparging for approximately 1 hour.

6) Steps 2 to 5 were repeated to condense the next amino acid.

The addition order of amino acids and condensing agents used to synthesize compound 4 is shown in Table 3.

TABLE 3

Addition order

| # | Raw material | Condensing agent |
|---|---|---|
| 1 | Fmoc-Cys(Trt)-OH (3.0 eq.) | HATU (2.85 eq.) and DIEA (6.0 eq.) |
| 2 | Fmoc-Trp(Boc)-OH (3.0 eq.) | HATU (2.85 eq.) and DIEA (6.0 eq.) |
| 3 | Fmoc-Hyp(tBu)-OH (3.0 eq.) | HATU (2.85 eq.) and DIEA (6.0 eq.) |
| 4 | Fmoc-Pro-OH (3.0 eq.) | HATU (2.85 eq.) and DIEA (6.0 eq.) |
| 5 | Fmoc-Thr(tBu)-OH (3.0 eq.) | HATU (2.85 eq.) and DIEA (6.0 eq.) |
| 6 | Fmoc-Ser(tBu)-OH (3.0 eq.) | HATU (2.85 eq.) and DIEA (6.0 eq.) |
| 7 | Fmoc-Trp(Boc)-OH (3.0 eq.) | HATU (2.85 eq.) and DIEA (6.0 eq.) |
| 8 | Fmoc-Asp(OtBu)-OH (3.0 eq.) | HATU (2.85 eq.) and DIEA (6.0 eq.) |
| 9 | Fmoc-hArg(Pbf)-OH (3.0 eq.) | HATU (2.85 eq.) and DIEA (6.0 eq.) |
| 10 | Fmoc-Met-OH (3.0 eq.) | HATU (2.85 eq.) and DIEA (6.0 eq.) |
| 11 | Fmoc-Pen(Trt)-OH (3.0 eq.) | HATU (2.85 eq.) and DIEA (6.0 eq.) |
| 12 | Fmoc-dAsp(OtBu)-OH (3.0 eq.) | HATU (2.85 eq.) and DIEA (6.0 eq.) |
| 13 | Fmoc-1Nal-OH (3.0 eq.) | HATU (2.85 eq.) and DIEA (6.0 eq.) |
| 14 | Fmoc-Pro-OH (3.0 eq.) | HATU (2.85 eq.) and DIEA (6.0 eq.) |
| 15 | Fmoc-Cys(Trt)-OH (3.0 eq.) | HATU (2.85 eq.) and DIEA (6.0 eq.) |
| 16 | Compound 3 (2.0 eq.) | HATU (1.90 eq.) and DIEA (4.0 eq.) |
| 17 | Fmoc-Sar-OH (5.0 eq.) | HATU (4.75 eq.) and DIEA (10.0 eq.) |
| 18 | Fmoc-Sar-OH (5.0 eq.) | HATU (4.75 eq.) and DIEA (10.0 eq.) |
| 19 | Fmoc-Sar-OH (5.0 eq.) | HATU (4.75 eq.) and DIEA (10.0 eq.) |
| 20 | Fmoc-Sar-OH (5.0 eq.) | HATU (4.75 eq.) and DIEA (10.0 eq.) |

TABLE 3-continued

Addition order

| # | Raw material | Condensing agent |
|---|---|---|
| 21 | Fmoc-Sar-OH (5.0 eq.) | HATU (4.75 eq.) and DIEA (10.0 eq.) |
| 22 | Fmoc-Sar-OH (5.0 eq.) | HATU (4.75 eq.) and DIEA (10.0 eq.) |
| 23 | Fmoc-Sar-OH (5.0 eq.) | HATU (4.75 eq.) and DIEA (10.0 eq.) |
| 24 | Fmoc-Sar-OH (5.0 eq.) | HATU (4.75 eq.) and DIEA (10.0 eq.) |
| 25 | Fmoc-Sar-OH (5.0 eq.) | HATU (4.75 eq.) and DIEA (10.0 eq.) |
| 26 | Fmoc-Sar-OH (5.0 eq.) | HATU (4.75 eq.) and DIEA (10.0 eq.) |
| 27 | Fmoc-β-Ala-OH (3.0 eq.) | HATU (2.85 eq.) and DIEA (6.0 eq.) |

Polypeptide Cleavage and Purification:

1) A cleavage buffer (90% TFA/2.5% TIS/2.5% $H_2O$/5.0% DTT) was added to a flask containing the side chain-protected polypeptide and stirred at room temperature for 2 hours.

2) The polypeptide was sedimented with ice isopropyl ether and centrifuged using a centrifuge (3 min, 3000 rpm).

3) The obtained polypeptide was washed twice more with isopropyl ether.

4) The crude polypeptide was dried to give the TFA salt of intermediate 4.

2. Synthesis of an acetate salt of compound Peptide_1

The crude TFA salt of intermediate 4 described above (2.4 g) was dissolved in 50% MeCN/$H_2O$ (1 L), and TATA (0.5 mmol) was slowly added to the stirred solution at room temperature. The reaction mixture was stirred at room temperature for 30 minutes, and then the pH was adjusted to 8 with $NH_4HCO_3$. The reaction was stirred at room temperature for an additional 12 hours. When LCMS showed that the reaction was complete, stirring was stopped. The mixture was purified by reverse phase preparation to give the acetate salt of compound Peptide_1.

TABLE 4

Purification conditions

| | First purification and separation conditions | Second purification and separation conditions |
|---|---|---|
| Dissolution condition | Dissolved in 20% MeCN/$H_2O$ | Dissolved in 20% MeCN/$H_2O$ |
| Machine model | Welch Sail-1000 | Gilson GX-281 |
| Mobile phase | A: $H_2O$ (0.075% TFA/$H_2O$) B $CH_3CN$ | A: $H_2O$ (0.5% AcOH/$H_2O$) B $CH_3CN$ |
| Separation gradient | 25-44%-40 min, retention time: 30 min | 14-34%-55 min, retention time: 24 min |
| Column type | Welch Xtimate ® C18 250*50 mm, 10 μm, 120 Å | YMC-Actus Triart C18, 250*30 mm, 5 μm, 120 Å |
| Flow rate | 80 mL/min | 20 mL/min |
| Wavelength | 214/254 nm | 214/254 nm |
| Temperature | 25° C. | 25° C. |

Peptide_2 and Peptide_3 were synthesized by reference to the synthesis of Peptide_1, and their structures are shown in Table 5.

TABLE 5

Structural sequences of Peptide_1 to 3

| Peptide_1 | β-Ala-Sar10-Lys-hArg-Asp-Cys-Pro-1Nal-dAsp-Pen-Met-hArg-Asp-Trp-Ser-Thr-Pro-HyP-Trp-Cys-$NH_2$,TATA | SEQ ID NO: 1 |
|---|---|---|
| Peptide_2 | β-Ala-Sar10-Lys-Sar-Asp-Cys-Pro-1Nal-dAsp-Pen-Met-hArg-Asp-Trp-Ser-Thr-Pro-HyP-Trp-Cys $NH_2$,TATA | SEQ ID NO: 2 |
| Peptide_3 | β-Ala-Sar10-Lys-Sar-Asp-Cys-Pro-1Nal-dAsp-Pen-Met-hArg-Asp-Trp-Ser-Thr-Pro-HyP-Trp-hCys-$NH_2$,TATA | SEQ ID NO: 3 |

4. Synthesis of a TFA Salt of Compound INT_1

Compound 1-1 (200.0 mg, 178.0 μmol) was dissolved in DMF (5 mL), and DIEA (31.0 μL, 178.0 μmol) was added at 0° C. and stirred for 10 min. Compound 1-2 (290.4 mg, 890.1 μmol) was dissolved in DMF (5 mL) in another reaction flask and stirred at 0° C. for 10 min. The reaction solution of compound 1-1 was then dropwise added to the stirred reaction solution of compound 1-2 at 0° C. and stirred at 0° C. for 30 min. The reaction solution was filtered to remove insoluble residues. The filtrate was directly purified by reverse phase preparation (mobile phase: A: H$_2$O containing 0.075% TFA, B: CH$_3$CN, gradient: 10%-40% (B), 42 min) to give the TFA salt of compound INT_1.

5. Synthesis of an acetate salt of Compound PDC_1

The acetate salt of compound Peptide_1 (34.0 mg, 10.1 μmol) was dissolved in DMF (0.3 mL), and then DIEA (7.00 μL, 40.4 μmol) was added and stirred at room temperature for 10 minutes. Next, the TFA salt of compound INT_1 (13.4 mg, 10.1 μmol) was dissolved in DMF (0.2 mL), dropwise added to the above reaction solution, and then stirred at room temperature for 2 hours. The reaction solution was filtered to remove insoluble residues. The filtrate was directly purified by reverse phase preparation (mobile phase: A: H$_2$O containing 0.075% TFA, B: CH&CN, gradient: 10%-40% (B), 42 min), lyophilized, and then converted to an acetate salt by preparation to give the acetate salt of compound PDC_1. MS m/z: 1533.4 (M+3H$^+$)/3.

EXAMPLE 2

PDC_2
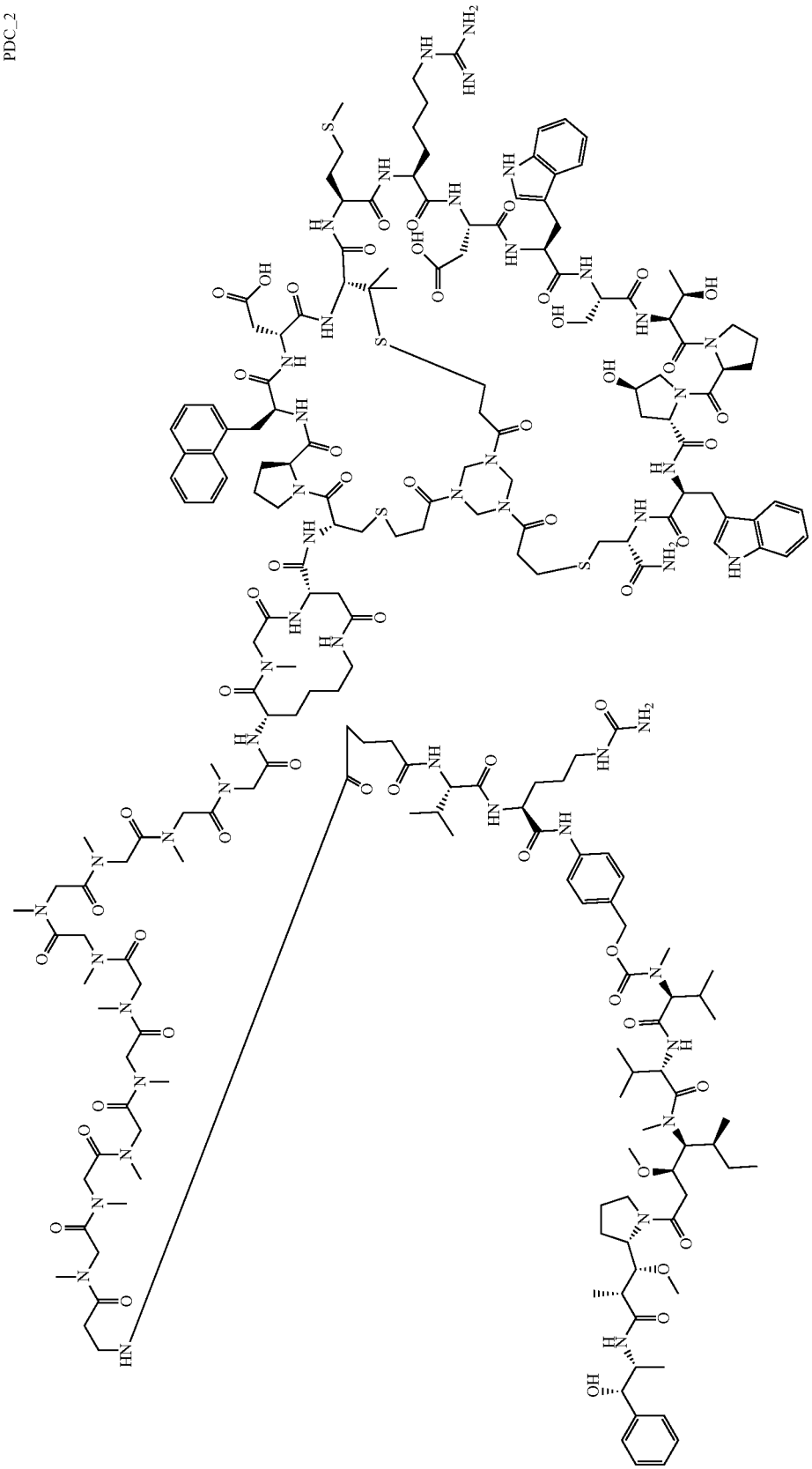

Synthetic Route 1:

An acetate salt of PDC_2 was prepared by reference to the synthetic route for the acetate salt of PDC_1 (replacing Peptide_1 with Peptide_2 in the reaction). MS m/z: 1500.5 (M+3H)/3.

Synthetic Route 2:

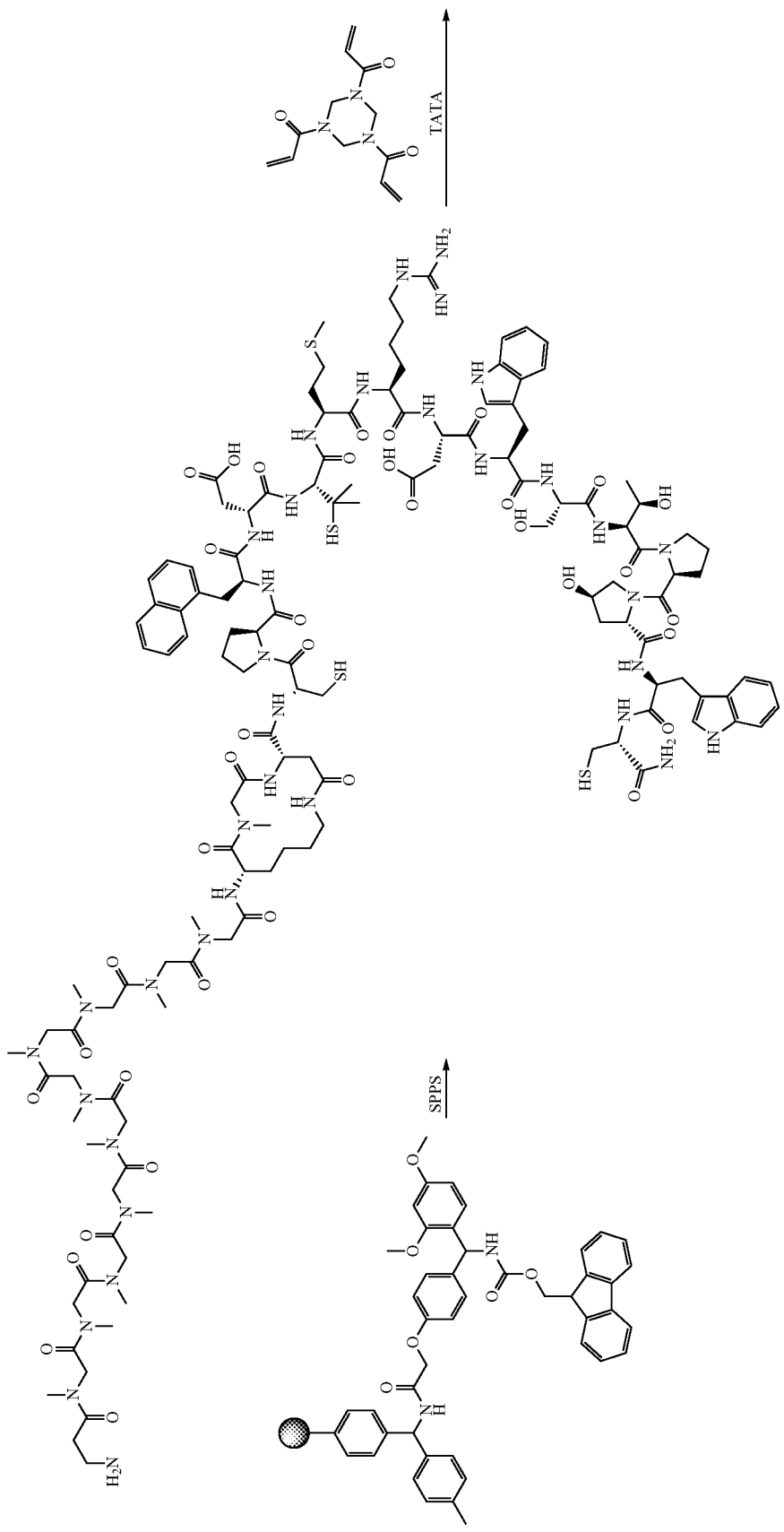

-continued
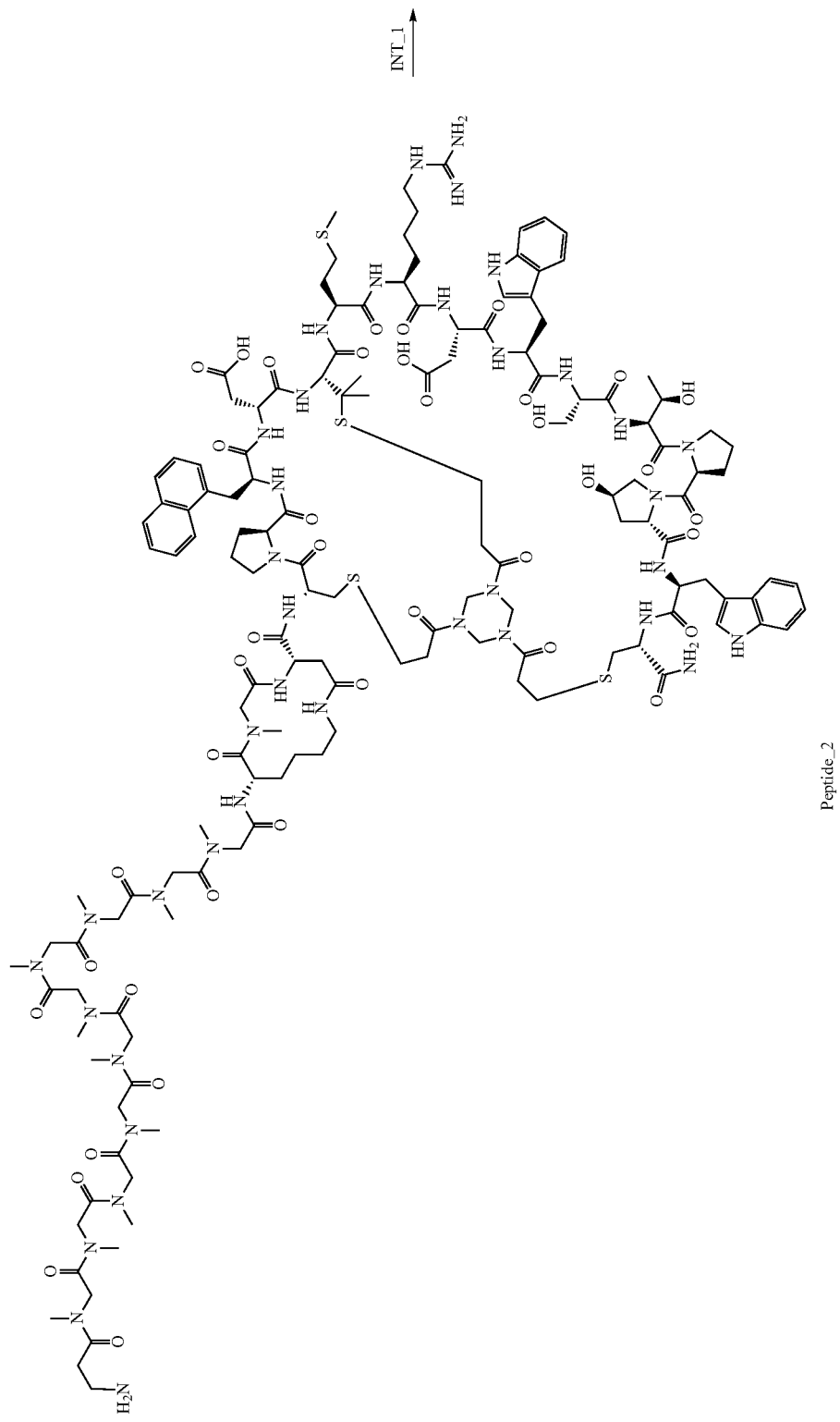
Peptide_2

-continued
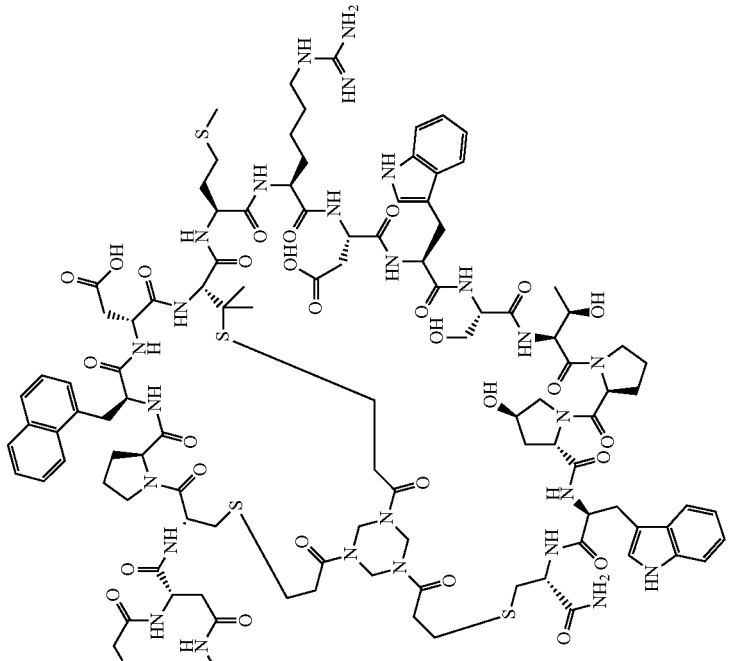
PDC_2
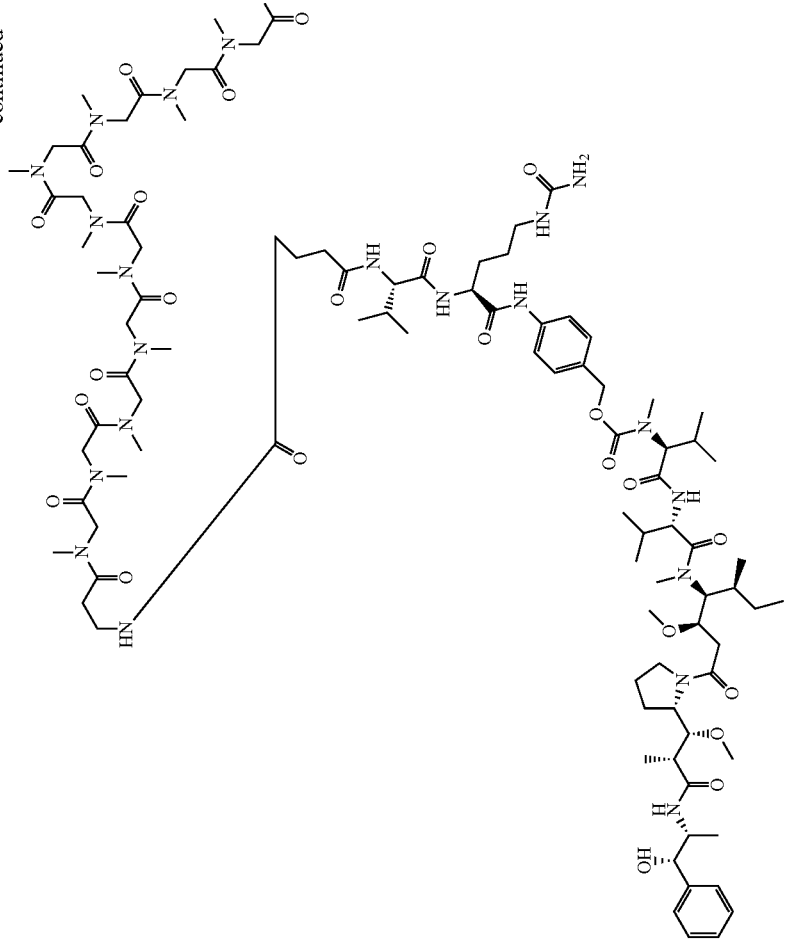

Step 1: Synthesis of Intermediate 5

The polypeptide was synthesized using the standard stepwise synthesis method.

1) DMF was added to a container containing Rink amide MBHA resin (5.0 mmol, 8.33 g, with 0.60 mmol/g of a substrate), and the resin was allowed to swell for 2 hours.

2) The obtained mixture was drained and then rinsed three times with DMF, with nitrogen sparging for 30 seconds each time.

3) A 20% piperidine/DMF was added, and then the system reacted for 30 min.

4) The obtained mixture was drained and then rinsed five times with DMF, with nitrogen sparging for 30 seconds each time.

5) A Fmoc-protected amino acid solution was added for 30 seconds, followed by a condensing agent, and the system reacted under $N_2$ sparging for approximately 1 hour.

6) Steps 2 to 5 were repeated to condense the next amino acid.

The addition order of amino acids and condensing agents used to synthesize intermediate 5 is shown in Table 6.

TABLE 6

Addition order

| # | Raw material | Condensing agent |
|---|---|---|
| 1 | Fmoc-Cys(Trt)-OH (3.0 eq.) | HBTU (2.85 eq.) and DIEA (6.0 eq.) |
| 2 | Fmoc-Trp(Boc)-OH (3.0 eq.) | HBTU (2.85 eq.) and DIEA (6.0 eq.) |
| 3 | Fmoc-Hyp(tBu)-OH (3.0 eq.) | HBTU (2.85 eq.) and DIEA (6.0 eq.) |
| 4 | Fmoc-Pro-OH (3.0 eq.) | HBTU (2.85 eq.) and DIEA (6.0 eq.) |
| 5 | Fmoc-Thr(tBu)-OH (3.0 eq.) | HBTU (2.85 eq.) and DIEA (6.0 eq.) |
| 6 | Fmoc-Ser(tBu)-OH (3.0 eq.) | HBTU (2.85 eq.) and DIEA (6.0 eq.) |
| 7 | Fmoc-Trp(Boc)-OH (3.0 eq.) | HBTU (2.85 eq.) and DIEA (6.0 eq.) |
| 8 | Fmoc-Asp(OtBu)-OH (3.0 eq.) | HBTU (2.85 eq.) and DIEA (6.0 eq.) |
| 9 | Fmoc-HArg (Pbf)-OH (3.0 eq.) | HATU (2.85 eq.) and DIEA (6.0 eq.) |
| 10 | Fmoc-Met-OH (3.0 eq.) | HATU (2.85 eq.) and DIEA (6.0 eq.) |
| 11 | Fmoc-Pen(Trt)-OH (3.0 eq.) | HATU (2.85 eq.) and DIEA (6.0 eq.) |
| 12 | Fmoc-dAsp(OtBu)-OH (3.0 eq.) | HATU (2.85 eq.) and DIEA (6.0 eq.) |
| 13 | Fmoc-1Nal-OH (3.0 eq.) | HATU (2.85 eq.) and DIEA (6.0 eq.) |
| 14 | Fmoc-Pro-OH (3.0 eq.) | HATU (2.85 eq.) and DIEA (6.0 eq.) |
| 15 | Fmoc-Cys(Trt)-OH (3.0 eq.) | HATU (2.85 eq.) and DIEA (6.0 eq.) |
| 16 | Fmoc-Asp(OAll)-OH (2.0 eq.) | HATU (1.90 eq.) and DIEA (4.0 eq.) |
| 17 | Fmoc-Sar-OH (3.0 eq.) | HATU (2.85 eq.) and DIEA (6.0 eq.) |
| 18 | Fmoc-Lys(Alloc)-OH (2.0 eq.) | HATU (1.90 eq.) and DIEA (4.0 eq.) |
| 19 | Remove of OAll and Alloc | Pd(PPh$_3$)$_4$ (0.1 eq) and PhSiH$_3$ (10.0 eq) |
| 20 | Cyclization | HATU (2.85 eq.) and DIEA (6.0 eq.) |
| 21 | Fmoc-Sar-OH (3.0 eq.) | HATU (2.85 eq.) and DIEA (6.0 eq.) |
| 22 | Fmoc-Sar-OH (3.0 eq.) | HATU (2.85 eq.) and DIEA (6.0 eq.) |
| 23 | Fmoc-Sar-OH (3.0 eq.) | HATU (2.85 eq.) and DIEA (6.0 eq.) |
| 24 | Fmoc-Sar-OH (3.0 eq.) | HATU (2.85 eq.) and DIEA (6.0 eq.) |
| 25 | Fmoc-Sar-OH (3.0 eq.) | HATU (2.85 eq.) and DIEA (6.0 eq.) |
| 26 | Fmoc-Sar-OH (3.0 eq.) | HATU (2.85 eq.) and DIEA (6.0 eq.) |
| 27 | Fmoc-Sar-OH (3.0 eq.) | HATU (2.85 eq.) and DIEA (6.0 eq.) |
| 28 | Fmoc-Sar-OH (3.0 eq.) | HATU (2.85 eq.) and DIEA (6.0 eq.) |
| 29 | Fmoc-Sar-OH (3.0 eq.) | HATU (2.85 eq.) and DIEA (6.0 eq.) |
| 30 | Fmoc-Sar-OH (3.0 eq.) | HATU (2.85 eq.) and DIEA (6.0 eq.) |
| 31 | Fmoc-β-Ala-OH (3.0 eq.) | HATU (2.85 eq.) and DIEA (6.0 eq.) |

7) A cleavage buffer (90% TFA/2.5% TIS/2.5% H$_2$O/5.0% DTT) was added to a flask containing the side chain-protected polypeptide and stirred at room temperature for 2 hours.

8) The polypeptide was sedimented with ice isopropyl ether and centrifuged using a centrifuge (3 min, 3000 rpm).

9) The obtained polypeptide was washed twice more with isopropyl ether.

10) The crude polypeptide was dried to give a crude intermediate 5.

Step 2: Synthesis of an Acetate Salt of Peptide_2

The crude intermediate 5 (15.0 g) was dissolved in 50% MeCN/H$_2$O (5 L), and TATA (7.5 mmol) was slowly added to the stirred solution at room temperature. The reaction mixture was stirred at room temperature for 30 minutes, and then the pH was adjusted to 8 with NH$_4$HCO$_3$. The reaction was stirred at room temperature for an additional 12 hours. When LCMS showed that the reaction was complete, stirring was stopped. The mixture was purified by reverse phase preparation (first purification: mobile phase: A: H$_2$O containing 0.075% TFA, B: CH$_3$CN, gradient: 10%-40% phase B, 42 min, retention time: 29 min; second purification: mobile phase: A: H$_2$O containing 0.5% AcOH, B: CH$_3$CN, gradient: 20%-40%, 40 min, retention time: 21 min; third purification: mobile phase: A: H$_2$O containing 0.5% AcOH, B: CH$_3$CN, gradient: 16%-36% (B), 40 min, retention time: 26 min) to give the acetate salt of intermediate Peptide_2.

Step 3: Synthesis of an Acetate Salt of PDC_2

The acetate salt of intermediate Peptide_2 (369 mg) and INT_1 (150 mg) were dissolved in DMF (6.00 mL), and DIEA (58.0 mg) was added. The mixture was stirred at room temperature for 5 hours. When LC-MS showed that the reaction was complete, the reaction was stopped. The reaction solution was filtered to remove insoluble residues. The filtrate was directly purified by reverse phase preparation (mobile phase: A: H$_2$O containing 0.075% TFA, B: CH$_3$CN, gradient: 10%-40% (B), 42 min), lyophilized, and then converted to an AcOH salt by preparation to give the acetate salt of PDC_2. MS m/z: 1500.3 (M+3H$^+$)/3.

EXAMPLE 3

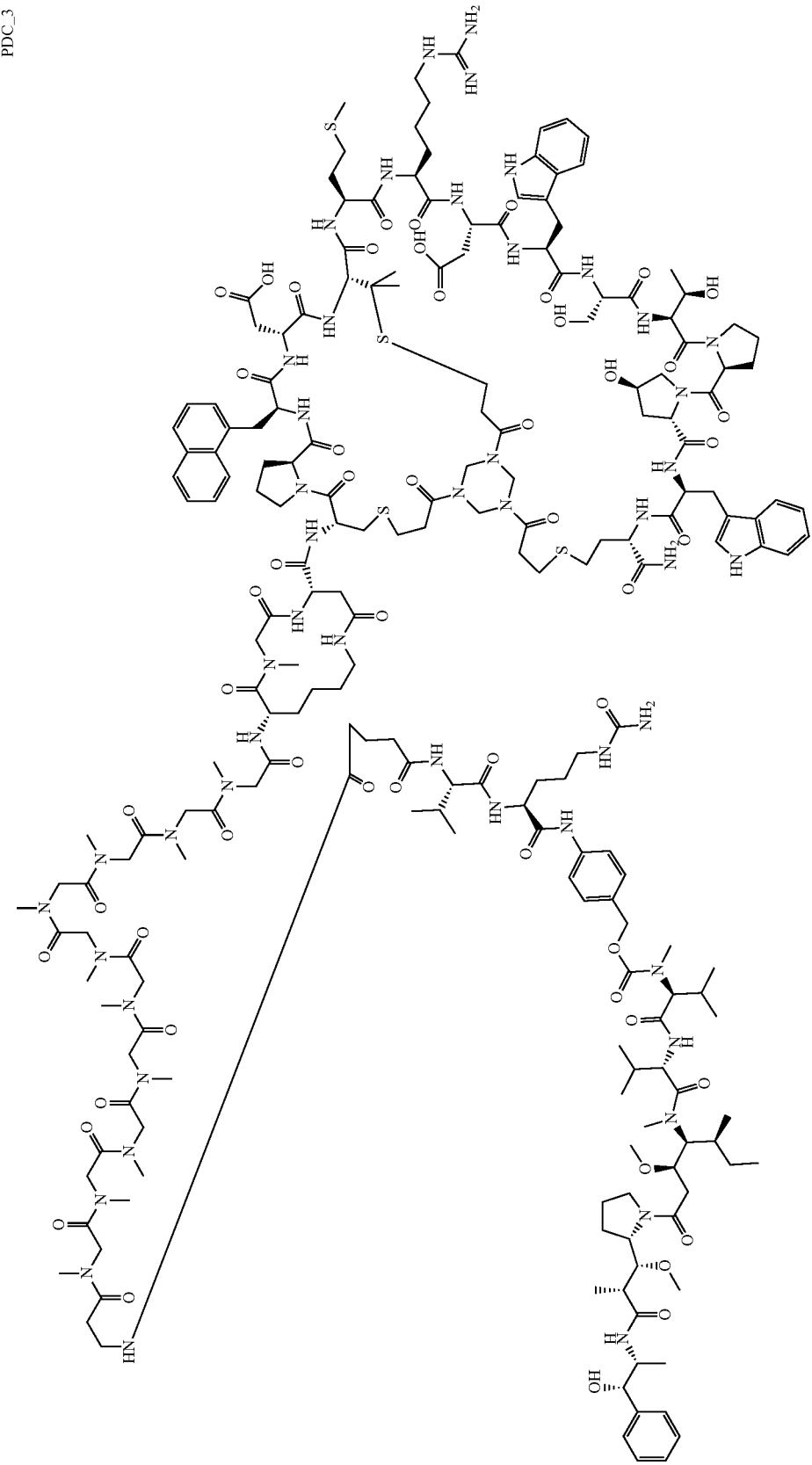

An acetate salt of PDC_3 was prepared by reference to the synthesis for the acetate salt of PDC_1 (replacing Peptide_1 with Peptide_3 in the reaction). MS m/z: 1504.8 (M+3H)/3.
Bioassay Data:

Test Example 1. Binding Capacity Test of the Compounds of the Present Invention to Nectin-4 Protein 1. Experimental Purpose To detect the affinity of the compound to be tested to the target protein Nectin-4 using the SPR method.

2. Materials and instruments

Biacore 8K (GE Healthcare)
96-well Plate (Cat #650101, greiner bio-one)
CM5 chip (Cat #BR-1005-30, GE Healthcare)
Amine Coupling Kit (Cat #BR-1000-50, GE Healthcare)
  EDC
  NHS
  1 M ethanolamine
10 mM sodium acetate pH 4.5 (Cat #BR-1003-50, GE Healthcare)
DMSO (Cat #D4540, Sigma)
P20 (Cat #BR-1000-54, GE Healthcare)
PBS (Cat #BR-1006-72, GE Healthcare)
Nectin-4 (Cat #1006-72, GE Healthcare)

3. Experimental Protocol

In this experiment, the amino coupling method was used. The target protein Nectin-4 was directly immobilized on the CM5 chip using Biacore 8K. The compound to be tested as an analyte was then diluted to a required concentration gradient with a buffer (10 mM PBS, pH 7.4, 137 mM NaCl, 2.7 mM KCl, 5% DMSO, and 0.05% P20) for multi-cycle kinetic detection, in which each cycle was formed by 180 seconds of sample injection and 180 seconds of dissociation, and then the next cycle was performed, to obtain kinetic analysis data on the affinity of the target protein Nectin-4 to the compound to be tested. The final data were subjected to Kinetics fitting analysis based on a 1:1 model using Biacore Insight Evaluation Software (V 2.0.15.12933).

4. Experimental Method and Procedure

1) Preparation of the buffer: 10 mM PBS, pH 7.4, 137 mM NaCl, 2.7 mM KCl, 5% DMSO, and 0.05% P20.

2) Activation of the CM5 chip: The CM5 chip was activated with 400 mM EDC and 100 mM NHS at a flow rate of 10 μL/min for 420 seconds.

3) Coupling of the target protein: The target protein was diluted to 10 μg/mL with 10 mM sodium acetate (pH 4.5) and coupled at a flow rate of 10 μL/min for 284 s. The 1 #, 2 #, and 3 #channels on the chip were used in the experiment, and the coupling results were 1639.9RU, 1747.8RU, and 1702.2RU, respectively.

4) Blocking of the CM5 chip: The CM5 chip was blocked with 1 M ethanolamine at a flow rate of 10 μL/min for 420 seconds.

5) Analyte concentration: The compound to be tested was diluted with the buffer. The compound to be tested was diluted from 100 nM to 0.78 nM in a 2-fold gradient.

6) Sample injection analysis: Each concentration of the working solution of the compound to be tested corresponded to one cycle, with a flow rate of 30 μL/min for binding for 180 seconds and dissociating for 180 seconds. The last cycle was a 5% DMSO solvent correction cycle.

7) All results were subjected to kinetics fitting analysis based on a 1:1 model.

5. Experimental Results

The experimental data of five effective concentrations were selected for Kinetics fitting analysis based on a 1:1 model using Biacore Insight Evaluation Software (V 2.0.15.12933). The results are shown in Table 7.

TABLE 7

Binding results of the compounds of the present invention to Human Nectin-4 SPR

| Compound | Human Nectin-4 SPR $k_D$ (nM) |
| --- | --- |
| Acetate salt of PDC_1 | 1.4 |
| Acetate salt of PDC_2 | 0.43[a] |
| Acetate salt of PDC_3 | 4.13 |

[a]An average of two tests.

Conclusion: The compounds of the present invention have a strong binding effect to Nectin-4.

Test Example 2: In Vitro Anti-Proliferative Activity of the Compounds of the Present Invention on Nci-H292 and Mda-Mb-468 Cells 1. Experimental Purpose To investigate the effect of the compounds of the present invention on inhibiting cell proliferation by detecting the effect of the compounds on cell activity in vitro in tumor cell lines MDA-MB-468 and NCI-H292.

2. Experimental Design:

Cell Culture

The tumor cell lines were cultured in a 37° C., no $CO_2$ incubator and a 37° C., 5% $CO_2$ incubator according to the culture conditions shown in Table 8, respectively. The cells were periodically passaged, and cells in a logarithmic growth phase were taken for plating.

TABLE 8

Cell lines and their culture methods

| Cell line | Cell type | Source | Cat. No. | Growth characteristics | Culture method |
| --- | --- | --- | --- | --- | --- |
| NCI-H292 | Human lung cancer | ATCC | CRL-1848 | Adherent | RPMI 1640 + 10% FBS |
| MDA-MB-468 | Human breast cancer | ATCC | HTB-132 | Adherent | Leibovitz's L-15 + 10% FBS |

Cell Plating

Cells in a logarithmic growth phase were harvested and centrifuged at 1000 rpm for 3 min at room temperature. The supernatant was discarded, and the cells were resuspended in 5 mL of a culture medium. Then, 20 μL of the cell suspension was pipetted and mixed with trypan blue at 1:1 for staining for 3 min to detect cell viability and to count viable cells. The cell density was adjusted to 3000 cells/well. Then, 90 μL of the cell suspension was added to each culture plate well, and a cell-free culture medium was added to blank control wells. The culture plate was incubated overnight in a 37° C., no $CO_2$, and 100% relative humidity incubator and a 37° C., 5% $CO_2$, and 100% relative humidity incubator, respectively.

Preparation of a Compound Stock Plate

Preparation of a 400× compound stock plate: The compound to be tested was gradient diluted with DMSO from the highest to the lowest concentration.

TABLE 9

| Dilution concentrations of the 400X stock plate | | | | | | | | | |
|---|---|---|---|---|---|---|---|---|---|
| | 1 | 2 | 3 | 4 | 5 | 6 | 7 | 8 | 9 |
| Concentration (μM) | 400 | 133.33 | 44.444 | 14.815 | 4.938 | 1.646 | 0.549 | 0.183 | 0.061 |

Preparation of a 10× Compound Working Solution and Compound Treatment of Cells

Preparation of a 10× compound working solution: 78 μL of a cell culture medium was added to a V-bottomed 96-well plate, and 2 μL of the compound solution of each concentration was pipetted from the 400× compound stock plate into the cell culture medium in the 96-well plate. Then, 2 μL of DMSO was added to vehicle control and blank control. After adding the compound or DMSO, the mixture was blown uniformly with a multichannel pipettor. Drug addition: 10 μL of the 10× compound working solution was added to the cell culture plate. Then, 10 μL of a DMSO-cell culture medium mixture was added to vehicle control and blank control. The 96-well cell plate was placed back into the incubators for 72 h.

Cell Viability Assay by CellTiter-Glo Luminescence

The detection was performed according to the instructions of the Promega CellTiter-Glo Luminescent Cell Viability Assay kit (Promega-G7573). The luminescence signal was detected on the En Vision® Multi-mode Plate Reader (En Vision 2104-10).

Data Analysis

The inhibition rate (IR) of the compound to be tested was calculated using the following formula: IR (%)=(1-(RLU compound-RLU blank control)/(RLU vehicle control-RLU blank control))*100%. The inhibition rates of the compounds at different concentrations were calculated in Excel. Then, the inhibition curves were plotted using GraphPad Prism 6.02 software, and the relevant parameters, including the minimum inhibition rate, the maximum inhibition rate, and $IC_{50}$, were calculated.

Experimental Results are Shown in Table 10.

TABLE 10

Results of anti-tumor cell proliferation of the compound of the present invention

| Tumor cell line | Compound | $IC_{50}$ (μM) | Minimum inhibition rate (%) | Maximum inhibition rate (%) |
|---|---|---|---|---|
| NCI-H292 | Acetate salt of PDC_2 | 0.0421 | 1.55 | 81.32 |
| MDA-MB-468 | Acetate salt of PDC_2 | 0.0323 | −10.28 | 86.28 |

The $IC_{50}$ difference between the two runs was within 2-fold.

Conclusion: The compound of the present invention has a significant inhibitory effect on the proliferation of cells cultured in vitro in the tumor cell lines MDA-MB-468 and NCI-H292.

Test Example 3: In Vivo Efficacy of the Compounds of the Present Invention in a Human Lung Cancer NCI-H292 Cell Subcutaneous Xenograft Tumor Model 1. Experimental purpose: To investigate the in vivo efficacy of the compounds of the present invention in a human lung cancer NCI-H292 cell subcutaneous xenograft tumor mouse model.

2. Experimental Design:

Cell culture: Human lung cancer NCI-H292 cells (ATCC, Manassas, VA, Cat. No: CRL-1848) were cultured as monolayers in vitro in RPMI 1640 culture medium supplemented with 10% fetal bovine serum in a 37° C., 5% $CO_2$ incubator. The cells were routinely digested twice a week with pancreatic enzyme-EDTA for passage. When the cell saturation was 80%-90% and the number met the requirement, the cells were harvested, counted, and inoculated.

Animals: BALB/c nude mice, female, 6-8 weeks old, weighing 17-21 grams.

Tumor inoculation: 0.2 mL ($1 \times 10^7$) of NCI-H292 cells were inoculated subcutaneously into the right back of each mouse.

Efficacy study: The compound was administered intravenously in groups of 6 animals per group when the mean tumor volume reached about 100-200 $mm^3$. The dose was 1.5 mg/kg, and the administration frequency was QW×3.

Observations: The preparation and any modifications of this experimental protocol would not be implemented until the evaluation and approval by the Shanghai WuXi AppTec Experimental Animal Ethics Committee (IACUC) was performed. The use and welfare of laboratory animals would follow the rules of the Association for Assessment and Accreditation of Laboratory Animal Care International (AAALAC). The animals were monitored daily for health status and mortality for routine examinations, including observation of tumor growth and effects of drug treatment on daily behavioral performance of the animals such as behavioral activity, food and water intake, weight change (weighing twice a week), appearance signs, or other abnormal conditions. The mortality of the animals and side effects within a group were recorded based on the number of animals in each group.

Experiment stop: The animals must be euthanized if their health condition continued to deteriorate, if the tumor size exceeded 2000 $mm^3$, or if they had severe illness or pain.

Data analysis: A T-test was used to compare the two groups. One-way ANOVA was used for comparison between three or more groups. If F values were significantly different, multiple comparisons should be performed after ANOVA analysis. All data analysis was performed using SPSS 17.0. $p<0.05$ indicates a significant difference.

Drug Formulation:

Frequency of drug formulation: Before the first administration, the stock solution was formulated uniformly, dispensed, and cryopreserved in a −80° C. refrigerator.

Administration volume: The administration volume was adjusted based on animal weight (administration volume=10 μL/g).

TABLE 11

Detailed protocol for compound formulation

| Compound | Packaging | Formulation method | Concentration (mg/mL) | Storage condition |
|---|---|---|---|---|
| Vehicle | — | 25 mM L-histidine (pH = 7), 10% sucrose Weigh 5 g of sucrose and add 50 mL of sterile water to formulate a 10% sucrose solution; Weigh 193.94 mg of L-histidine, add 10% sucrose, stir, adjust pH to 7, and dilute to 50 mL to formulate a homogeneous solution. | — | 4° C. |
| Acetate salt of PDC_2 | 2.0 mg/flask | Add 2 mg of PDC_2 to 1.8 mL of vehicle, vortex, and dissolve to formulate a 1.0 mg/mL homogeneous clear solution. Dispense into 0.3 mL/flask × 3 tubes (for efficacy) and store at −80° C. | 1.0 | −80° C. |
|  |  | Take 0.3 mL of 1.0 mg/mL PDC_2 solution, add 1.7 mL of vehicle, vortex, and dissolve to formulate a homogeneous clear solution. | 0.15 | Ready-to-use |

Figure 2:
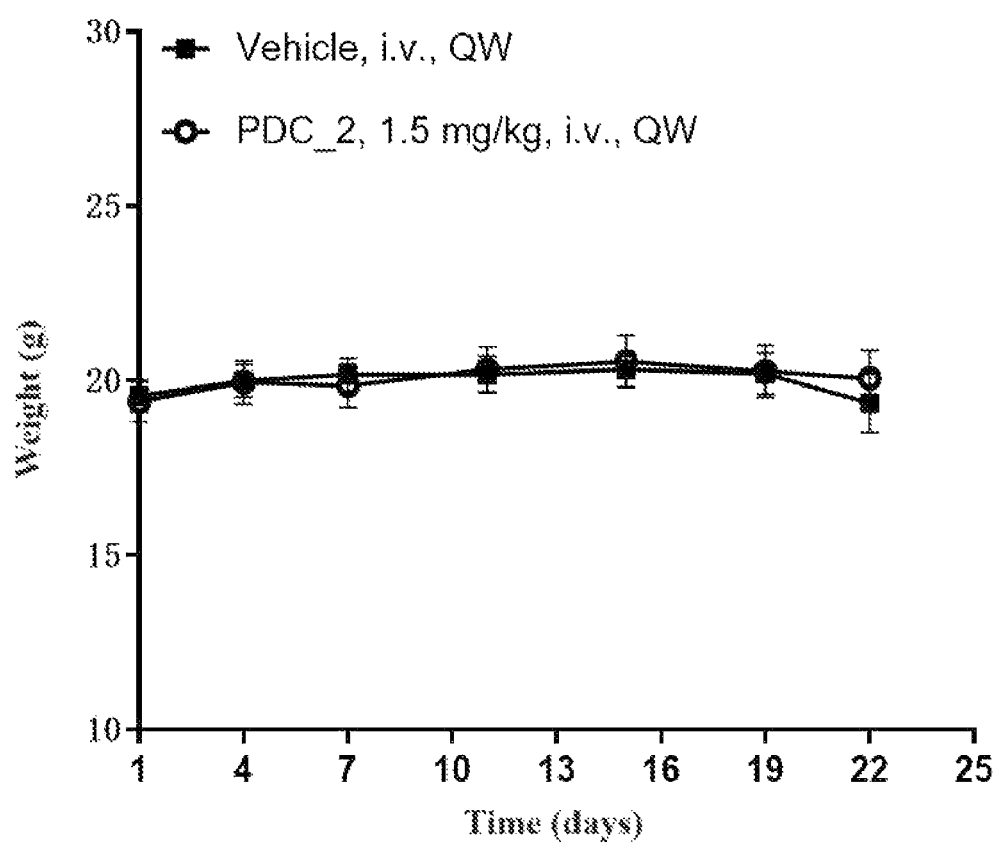
FIG. 2 shows an animal weight change curve of a compound of the present invention in a human lung cancer NCI-H292 cell subcutaneous xenograft tumor model.

Experimental results: See FIG. 1 and FIG. 2.

Experimental conclusion: The compound of the present invention shows a significant tumor growth inhibition effect in a human lung cancer NCI-H292 cell subcutaneous xenograft tumor model.

Test Example 4: In Vivo Pharmacodynamic Study of the Compounds of the Present Invention in a Human Breast Cancer MDA-MB-468 Cell Subcutaneous Xenograft Tumor BALB/c Nude Mouse Model Experimental purpose: To evaluate the in vivo efficacy of the compounds of the present invention in a human breast cancer MDA-MB-468 cell subcutaneous xenograft tumor model.

Cell culture: Human breast cancer MDA-MB-468 cells (ATCC, Manassas, VA, Cat. No: HTB-132) were cultured as monolayers in vitro in a L-15 culture medium supplemented with 10% fetal bovine serum, 100 U/mL penicillin, and 100 μg/mL streptomycin in a 37° C., 0% $CO_2$ incubator. The cells were routinely digested twice a week with pancreatic enzyme-EDTA for passage. When the cell saturation was 80%-90% and the number met the requirement, the cells were harvested, counted, and inoculated.

Animals: BALB/c nude mice, female, 6-8 weeks old, weighing 18-22 grams, supplied by Beijing Vital River Laboratory Animal Technology Co., Ltd.

Tumor inoculation: 0.2 mL ($1\times10^7$) of MDA-MB-468 cells (with Matrigel, volume ratio of 1:1) were inoculated subcutaneously into the right back of each mouse.

Administration volume: The administration volume was adjusted based on animal weight (administration volume=10 μL/g).

Drug formulation: The compound to be tested was formulated into a 1.5 mg/mL homogeneous solution using 25 mM L-histidine (pH=7) in 10% sucrose as a vehicle and stored in a −80° C. refrigerator. The homogeneous solution was diluted to a corresponding concentration for IV (intravenous injection) group administration on the day of administration.

Figure 3:
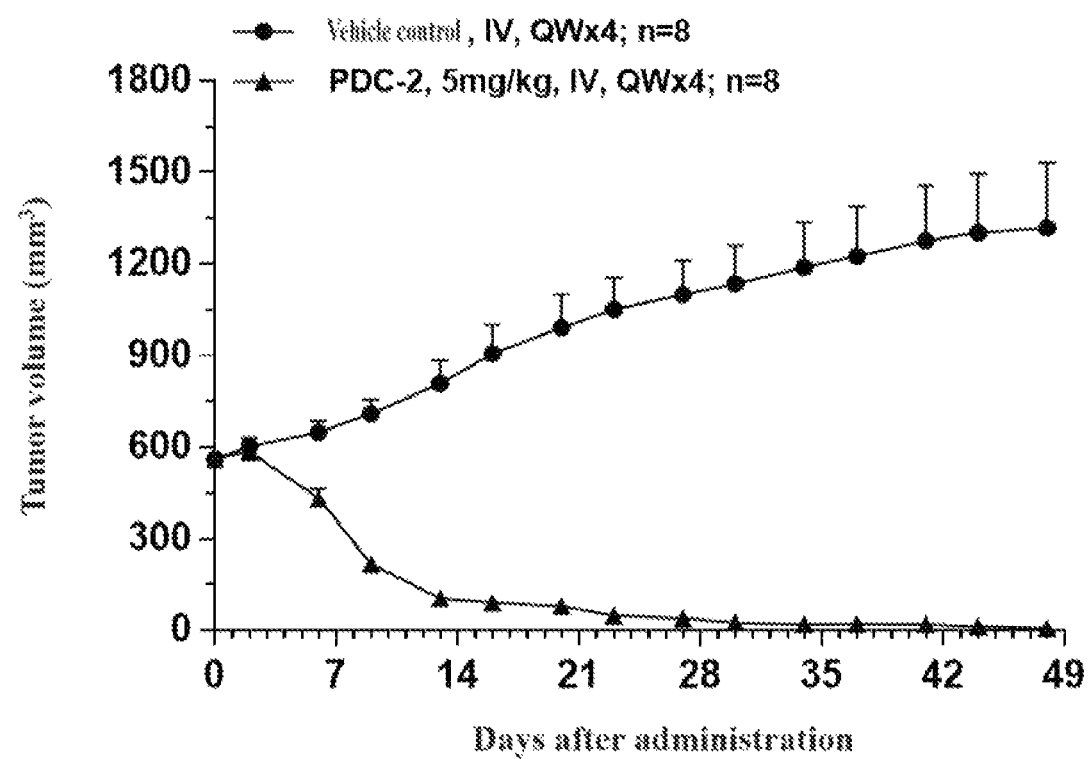
FIG. 3 shows a tumor growth curve of a compound of the present invention administered in groups when the mean tumor volume reaches about 500-600 mm$^3$ in a human breast cancer MDA-MB-468 cell subcutaneous xenograft tumor BALB/c nude mouse model.
Figure 4:
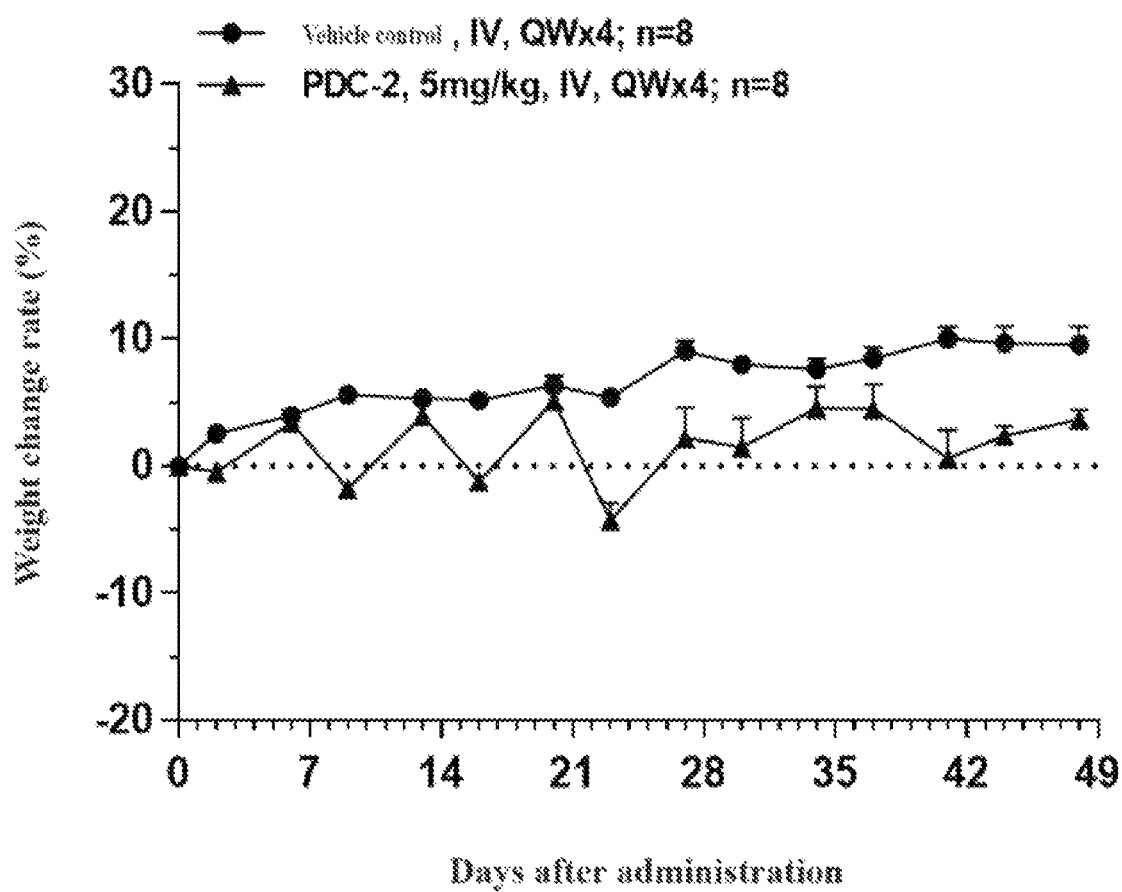
FIG. 4 shows an animal weight change rate of a compound of the present invention administered in groups when the mean tumor volume reaches about 500-600 mm$^3$ in a human breast cancer MDA-MB-468 cell subcutaneous xenograft tumor BALB/c nude mouse model.

Grouping: The compound was administered in groups when the mean tumor volume reached about 500-600 mm³. The dose was 5 mg/kg, and the administration frequency was QW×4. Experimental results are shown in FIG. 3 and FIG. 4.

Experimental conclusion: In the case of large volume grouping, the compound of the present invention still shows a significant tumor growth inhibition effect, a dose correlation, no adverse reaction, no mean weight loss of 5% or more, and good safety in a human breast cancer cell MDA-MB-468 subcutaneous xenograft tumor model.

Test Example 5: Pharmacokinetic Analysis of the Compounds of the Present Invention in Rat Plasma A. Experimental purpose To test the pharmacokinetics of the compounds of the present invention in SD rats.

B. Experimental Procedures

The pharmacokinetic characteristics of the compound after intravenous injection were tested in rats according to a standard protocol. The compound to be tested was formulated into a clear solution using 25 mM L-histidine (pH=7) in 10% sucrose as a vehicle. Two rats were given a single intravenous injection of 3 mg/kg of the compound to be tested. Whole blood was collected at time points of 0.083, 0.25, 0.5, 1, 2, 4, 8, and 24 hours after administration to get plasma. The concentration of the compound of the present invention and the concentration of its potential metabolite MMAE were analyzed by the LC-MS/MS method, and the pharmacokinetic parameters were calculated by Phoenix WinNonlin software.

C. Experimental Results

Experimental results are shown in Table 12.

TABLE 12

Pharmacokinetic test results in rats

| Compound No. | Parameter | Value |
|---|---|---|
| Acetate salt of PDC_2 | Dose (mg/kg) | 3 |
|  | $C_0$ (μM) | 6.9 |
|  | $T_{1/2}$ (hr) | 0.7 |
|  | $Vd_{ss}$ (L/kg) | 0.1 |
|  | Cl (mL/min/kg) | 2.7 |
|  | $AUC_{0\text{-}last}$ (μM · h) | 4.4 |
| MMAE | $C_{max}$ (μM) | 0.07 |
|  | $AUC_{0\text{-}last}$ (μM · h) | 0.11 |

Conclusion: The compound of the present invention has a short half-life and rapid clearance in rat blood, and the exposure of metabolite MMAE is only about 1/40 of the exposure of the compound of the present invention, indicating good safety.

Test Example 6: Pharmacokinetic Analysis in Cynomolgus Macaque Plasma

A. Experimental Purpose

To test the pharmacokinetics of the compounds of the present invention in Cynomolgus macaques.

B. Experimental Procedures

The pharmacokinetic characteristics of the compound after intravenous injection were tested according to a standard protocol in Cynomolgus macaques. The compound to be tested was formulated into a clear solution using 25 mM L-histidine (pH=7) in 10% sucrose as a vehicle. Cynomolgus macaques were given a single intravenous injection of 1 mg/kg of the compound to be tested. Whole blood was collected at time points of 0.083, 0.25, 0.5, 1, 2, 4, 8, and 24 hours after administration to get plasma. The concentration of the compound to be tested and the concentration of its potential metabolite MMAE were analyzed by the LC-MS/MS method, and the pharmacokinetic parameters were calculated by Phoenix WinNonlin software.

C. Experimental Results

Experimental results are shown in Table 13.

TABLE 13

Pharmacokinetic test results in Cynomolgus macaques

| Compound No. | Parameter | Value |
|---|---|---|
| Acetate salt of PDC_2 | Dose (mg/kg) | 1 |
|  | $C_0$ (μM) | 3.1 |
|  | $T_{1/2}$ (hr) | 1.5 |
|  | $Vd_{ss}$ (L/kg) | 0.2 |
|  | Cl (mL/min/kg) | 3.6 |
|  | $AUC_{0\text{-}last}$ (μM · h) | 1.0 |
| MMAE | $C_{max}$ (μM) | 0.00 |
|  | $AUC_{0\text{-}last}$ (μM · h) | 0.00 |

Conclusion: The compound of the present invention has a short half-life and rapid clearance in Cynomolgus macaque blood, lower MMAE release in blood than a detection limit, and good safety.

Test Example 7: Metabolic Stability of the Compounds of the Present Invention in Hepatocytes from Mice, Rats, Cynomolgus Macaques, and Humans A. Experimental Purpose To investigate the metabolic stability of the compounds of the present invention in hepatocytes from mice, rats, Cynomolgus macaques, and humans.

B. Experimental Procedures

Incubations were performed in 96-well plates using an external extraction method. Several 96-well sample precipitation plates, designated T0, T15, T30, T60, T90, T0-MC, T90-MC, and blank matrix, were prepared, respectively. The recovery culture medium and incubation culture medium were removed in advance and placed in a 37° C. water bath for preheating. Frozen hepatocytes from CD-1 mice, SD rats, Cynomolgus macaques, and humans were removed from a liquid nitrogen tank, recovered, and diluted to $0.51 \times 10^6$ cells/mL with the incubation culture medium. Then, 198 μL of hepatocyte suspension ($0.5 \times 10^6$ cells/mL) was added to the preheated incubation plates, and 198 μL of a hepatocyte-free incubation culture medium was added to the T0-MC and T90-MC incubation plates as culture medium control groups. All incubation plates were pre-incubated in a 37° C. incubator for 10 minutes. Then, 2 μL working solutions of the test sample and control compound were added and mixed uniformly. The incubation plates were placed in a shaker inside the incubator for incubation. Three replicates were prepared for each time point. Incubation conditions were 37° C., saturated humidity, and 5% $CO_2$. In the test system, the test sample had a final concentration of 1 μM; the control had a final concentration of 3 μM; the hepatocytes had a final concentration of $0.5 \times 10^6$ cells/mL; and the total organic solvent had a final concentration of 1.0%, in which the DMSO had a final concentration of 0.1%.

At the end of the incubation at the corresponding time point, the incubation plates were removed, from which 25 μL of a compound mixture with the cells and a control compound mixture with the cells were removed and added to sample plates containing 125 μL of stop buffer, respectively. For a blank sample plate, 25 μL of the hepatocyte-free incubation culture medium was directly added. All sample plates were sealed with film, shaken at 600 rpm on a plate shaker for 10 minutes, and centrifuged at 3220×g for 20 minutes. The test sample and control supernatant were diluted with purified water at a ratio of 1:3. All samples were mixed uniformly and then analyzed by the LC-MS/MS method.

The concentration of the compound to be tested and the concentration of the control in the sample were semi-quantitatively determined by the liquid chromatography-tandem mass spectrometry (LC-MS/MS) method without a standard curve and quality control sample. The ratio of an analyte peak area to an internal standard peak area was used to express the concentration in the sample. Retention times, chromatogram acquisition, and integration of chromatograms of the analyte and the internal standard were processed using the software Analyst (Sciex, Framingham, Massachusetts, USA).

C. Experimental Results

Experimental results are shown in Table 14.

TABLE 14

Metabolic stability results of the compound of the present invention in hepatocytes from CD-1 mice, SD rats, Cynomolgus macaques, and humans

| Compound No. | Species | $T_{1/2}$ (min) | $CL_{int\ (liver)}$ (mL/min/kg) |
|---|---|---|---|
| Acetate salt of PDC_2 | CD-1 mice | >216.8 | <75.9 |
| | SD rats | >216.8 | <29.9 |
| | Cynomolgus macaques | >216.8 | <23 |
| | Humans | >216.8 | <17.8 |

Conclusion: The compound of the present invention has excellent metabolic stability in liver microsomes from 4 species.

Test Example 8: Metabolic Stability of the Compounds of the Present Invention in Kidney S9 from Mice, Rats, Cynomolgus Macaques, and Humans A. Experimental Purpose To investigate the metabolic stability of the compounds of the present invention in kidney S9 from mice, rats, Cynomolgus macaques, and humans.

B. Experimental Procedures

Materials: Kidney S9 from CD-1 mice, SD rats, Cynomolgus macaques, and humans were purchased from BioIVT or XenoTech LLC and stored in a −80° C. refrigerator.

Experimental procedure: Eight 96-well plates, designated T0, T5, T15, T30, T45, T60, Blank, and NCF60, were prepared. The first six incubation plates corresponded to reaction time points of 0, 5, 15, 30, 45, and 60 minutes, respectively. No test sample or control compound was added to the Blank plate.

The T0, T5, T15, T30, T45, and T60 plates were added with a 2 µL working solution of the test sample (10 mM of a solution of the compound to be tested in DMSO, diluted to 100 µM with 100% acetonitrile) and 100 µL of a S9 working solution (kidney S9 protein concentration of 1.0 mg/mL), and the Blank plate was only added with the S9 working solution. The above incubation plates were then placed in a 37° C. water bath for pre-incubation for about 10 minutes.

At the end of the pre-incubation, 98 µL of an auxiliary enzyme working solution was added to each sample well except the T0 plate to start the reaction. After an appropriate incubation time (e.g., 5, 15, 30, 45, and 60 minutes), 600 µL of stop buffer (an acetonitrile solution containing 100 ng/ml Tolbutamide and 100 ng/mL labetalol) was added to each sample well to stop the reaction. Preparation of the T0 plate: The T0 plate was first added with 600 µL of stop buffer and then 98 µL of the auxiliary enzyme working solution. All sample plates were shaken uniformly and centrifuged at 3220×g for 20 minutes. Then, 100 µL of supernatant was removed from each well and diluted into 300 µL of purified water for liquid chromatography-tandem mass spectrometry analysis.

C. Experimental Results

Experimental results are shown in Table 15.

TABLE 15

Metabolic stability results of the compound of the present invention in kidney S9 from CD-1 mice, SD rats, Cynomolgus macaques, and humans

| Compound No. | Species | $T_{1/2}$ (min) | $CL_{int\ (S9)}$ (µL/min/mg) |
|---|---|---|---|
| Acetate salt of PDC_2 | CD-1 mice | >145 | <9.6 |
| | SD rats | >145 | <9.6 |
| | Cynomolgus macaques | >145 | <9.6 |
| | Humans | >145 | <9.6 |

Conclusion: The compound of the present invention has excellent metabolic stability in kidney S9 from 4 species.

Test Example 9: Stability Analysis of the Compounds of the Present Invention in Plasma from Different Species A. Experimental Purpose To test the stability of the compounds of the present invention in plasma from SD rats, Cynomolgus macaques, and humans.

B. Experimental Procedures

The corresponding incubation plates, including T0, T10, T30, T60, T120, and T240 incubation plates, were added with a 2 µL working solution of the compound to be tested (100 µM). Three parallel wells were prepared for each sample. Then, 98 µL of blank plasma from SD rats, Cynomolgus macaques, and humans was added to the corresponding incubation plates to which the working solution had been added. All samples were incubated in a 37° C. water bath. The compound to be tested had a final incubation concentration of 2 µM. At the end of each incubation time point, the corresponding incubation plate was removed, added with stop buffer, precipitated, and centrifuged for 20 minutes. Then, 150 µL of the supernatant was analyzed by the LC-MS/MS method. The concentration of the compound to be tested in the sample was semi-quantitatively determined by the liquid chromatography-tandem mass spectrometry (LC-MS/MS) method.

C. Experimental Results

Experimental results are shown in Table 16.

TABLE 16

Stability results of the compound of the present invention in plasma from SD rats, Cynomolgus macaques, and humans

| Compound No. | Species | $T_{1/2}$ (min) |
|---|---|---|
| Acetate salt of PDC_2 | SD rats | >578.1 |
| | Cynomolgus macaques | >578.1 |
| | Humans | >578.1 |

Conclusion: The compound of the present invention has excellent stability with a half-life greater than 578.1 min in all three species.

SEQUENCE LISTING

```
Sequence total quantity: 3
SEQ ID NO: 1                 moltype = AA  length = 29
FEATURE                      Location/Qualifiers
source                       1..29
                             mol_type = protein
                             organism = synthetic construct
SITE                         1
                             note = bAla
SITE                         2..11
                             note = Sar
SITE                         13
                             note = hArg
SITE                         17
                             note = 1Nal
SITE                         18
                             note = dAsp
SITE                         19
                             note = Pen
SITE                         21
                             note = hArg
SITE                         27
                             note = HyP
SEQUENCE: 1
XXXXXXXXX XKXDCPXXXM XDWSTPXWC                                              29

SEQ ID NO: 2                 moltype = AA  length = 29
FEATURE                      Location/Qualifiers
source                       1..29
                             mol_type = protein
                             organism = synthetic construct
SITE                         1
                             note = bAla
SITE                         2..11
                             note = Sar
SITE                         13
                             note = Sar
SITE                         17
                             note = 1Nal
SITE                         18
                             note = dAsp
SITE                         19
                             note = Pen
SITE                         21
                             note = hArg
SITE                         27
                             note = HyP
SEQUENCE: 2
XXXXXXXXX XKXDCPXXXM XDWSTPXWC                                              29

SEQ ID NO: 3                 moltype = AA  length = 29
FEATURE                      Location/Qualifiers
source                       1..29
                             mol_type = protein
                             organism = synthetic construct
SITE                         1
                             note = bAla
SITE                         2..11
                             note = Sar
SITE                         13
                             note = Sar
SITE                         17
                             note = 1Nal
SITE                         18
                             note = dAsp
SITE                         19
                             note = Pen
SITE                         21
                             note = hArg
SITE                         27
                             note = HyP
SITE                         29
                             note = hCys
SEQUENCE: 3
XXXXXXXXX XKXDCPXXXM XDWSTPXWX                                              29
```

What is claimed is:

1. A compound as represented by formula (III), or a pharmaceutically acceptable salt thereof,

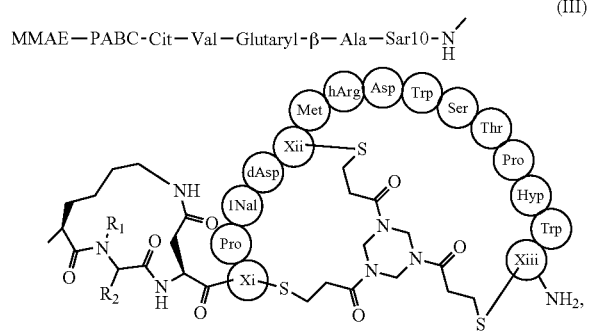

(III)

wherein $R_1$ is selected from H and $C_{1-3}$ alkyl;

$R_2$ is selected from the H, $C_{1-4}$ alkyl, and

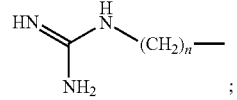

;

n is selected from 1, 2, 3, and 4; and

Xi, Xii, and Xiii are each independently selected from Cys, hCys, βCys, and Pen.

2. The compound or the pharmaceutically acceptable salt thereof according to claim 1, wherein the compound is selected from structures as represented by formula (III-1) and formula (III-2),

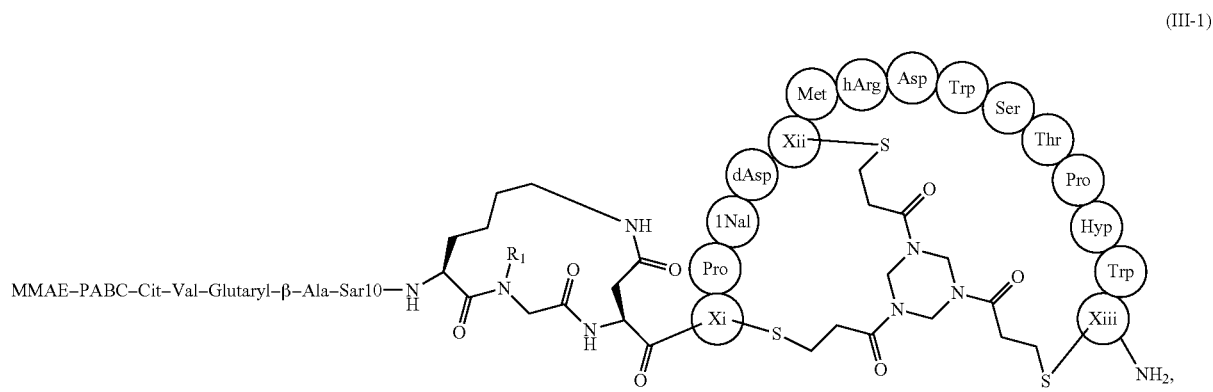

(III-1)

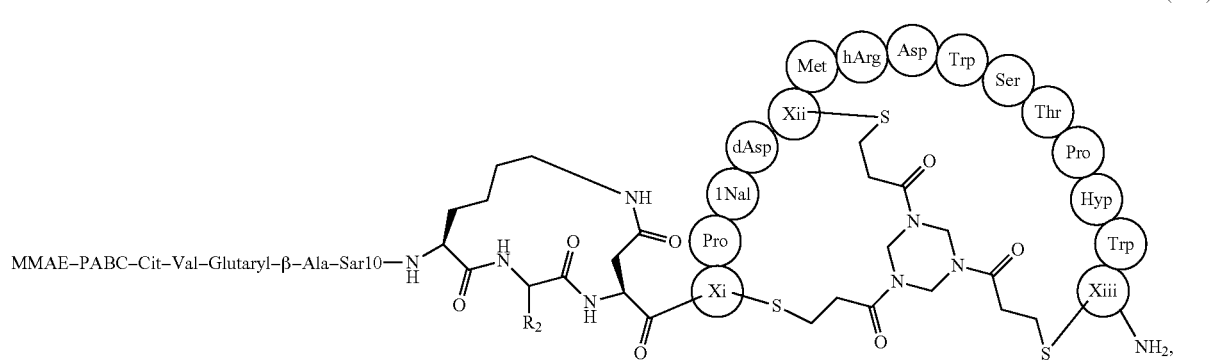

(III-2)

wherein the $R_1$, the $R_2$, the Xi, the Xii, and the Xiii are as defined in claim 1.

3. Compounds as represented by the following formulas, or pharmaceutically acceptable salts thereof,

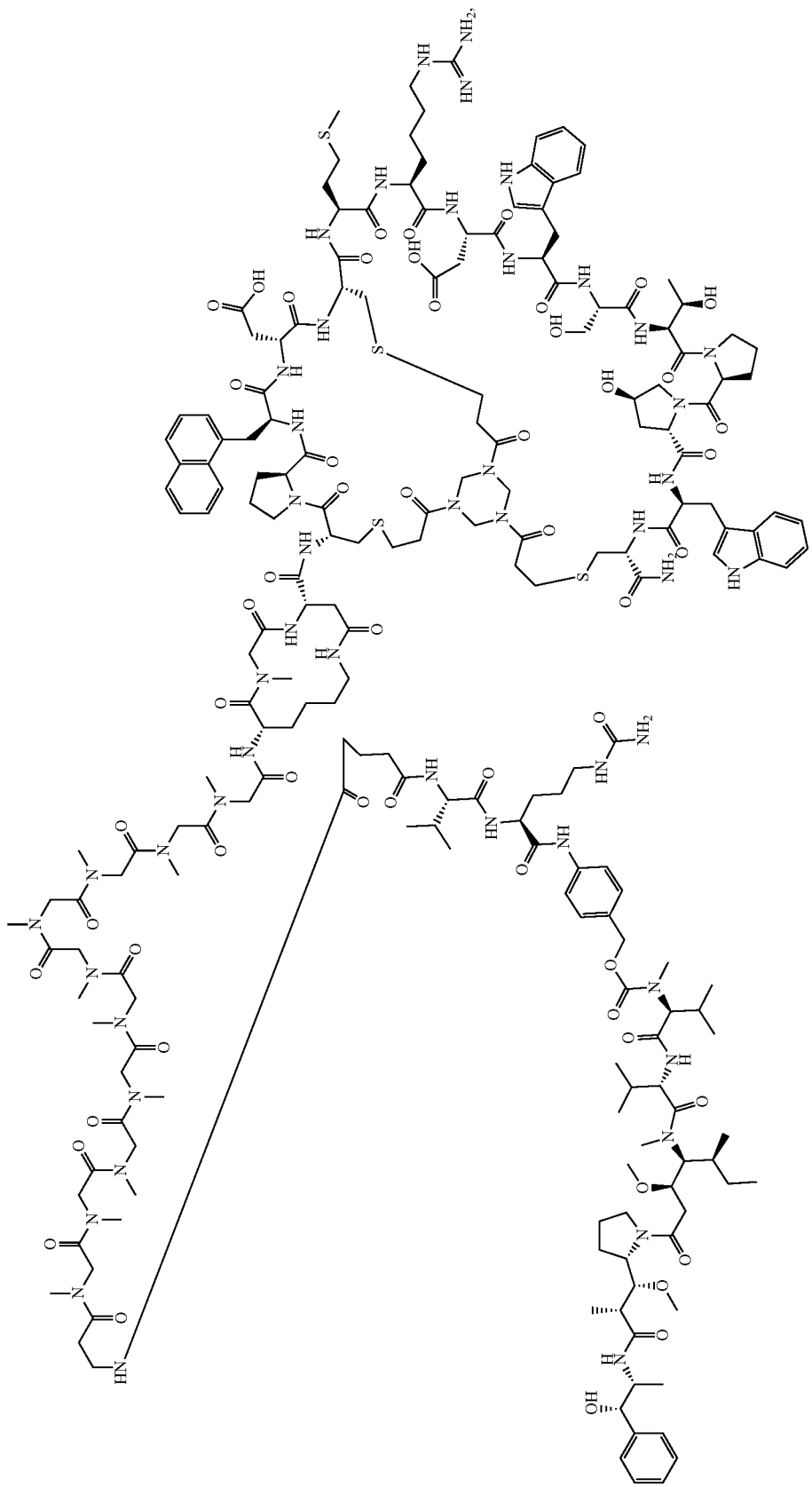

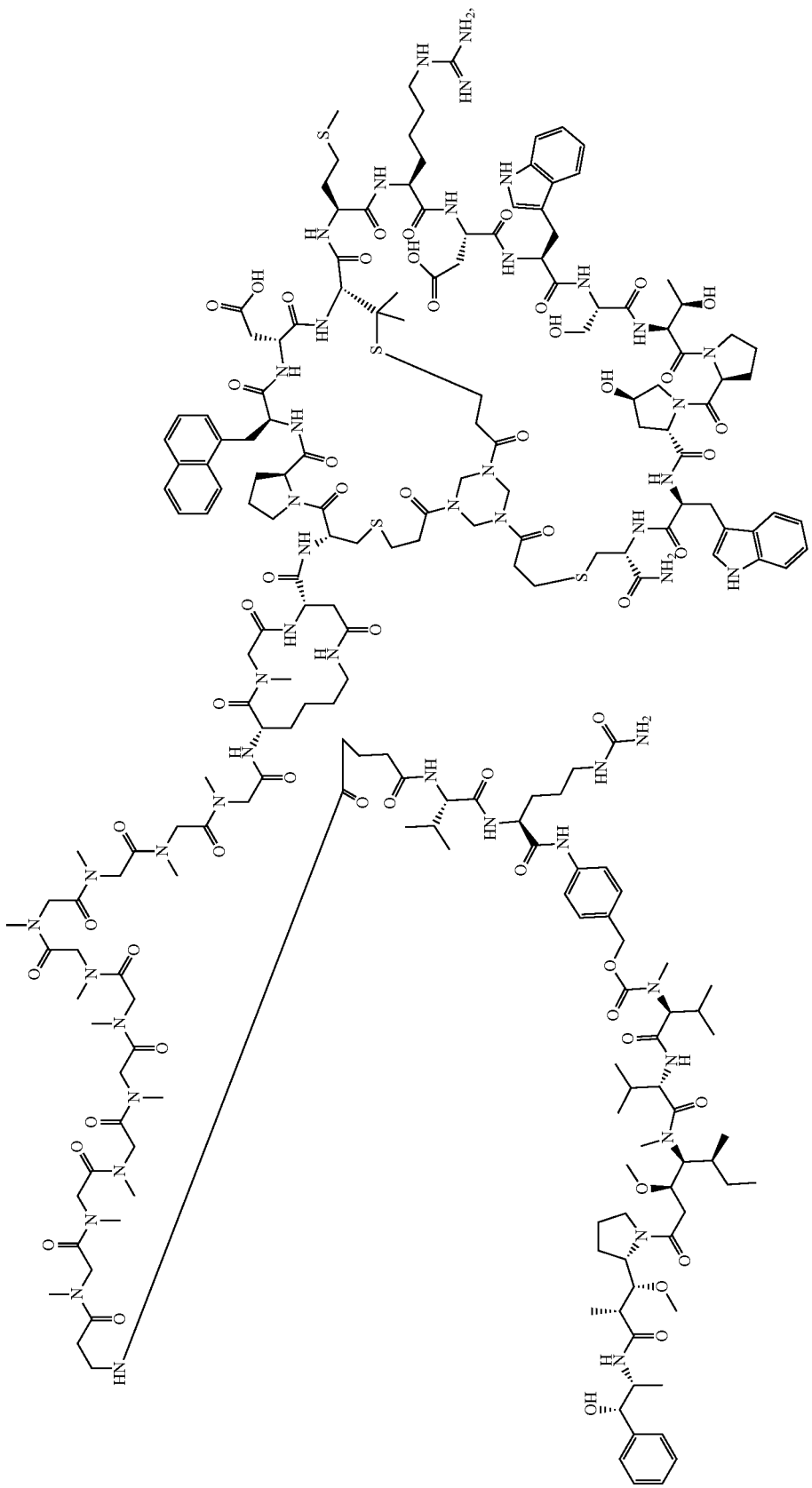

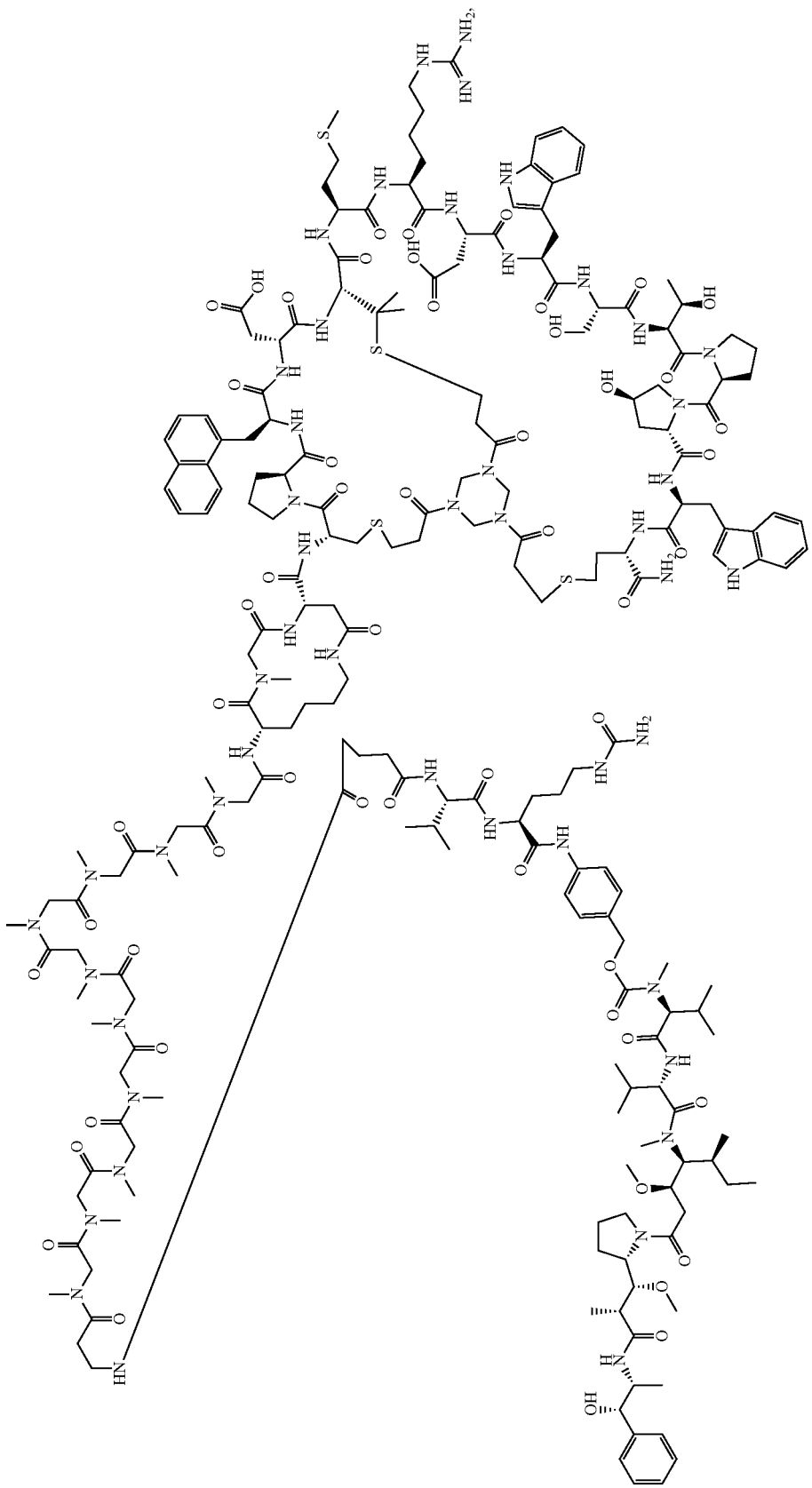

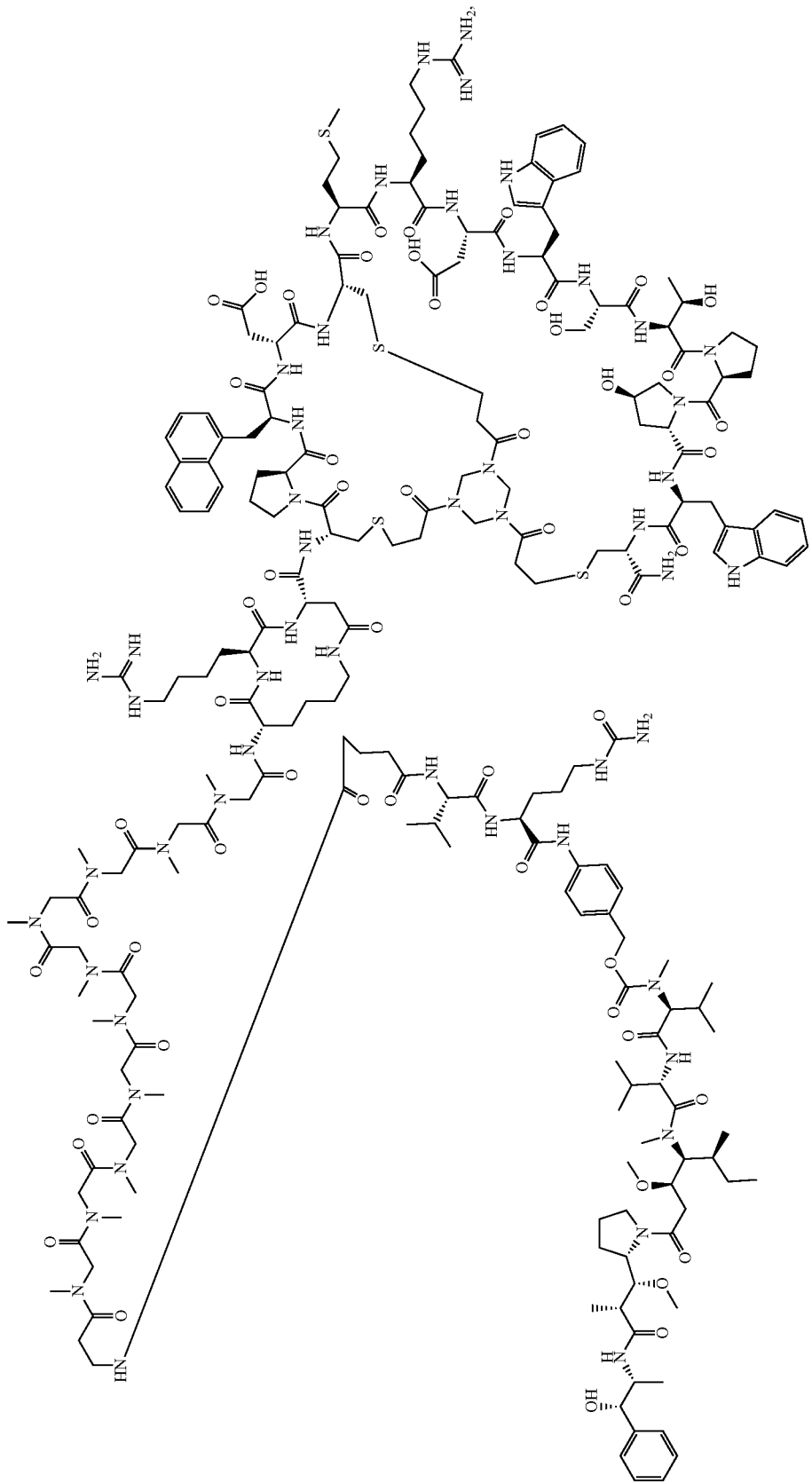

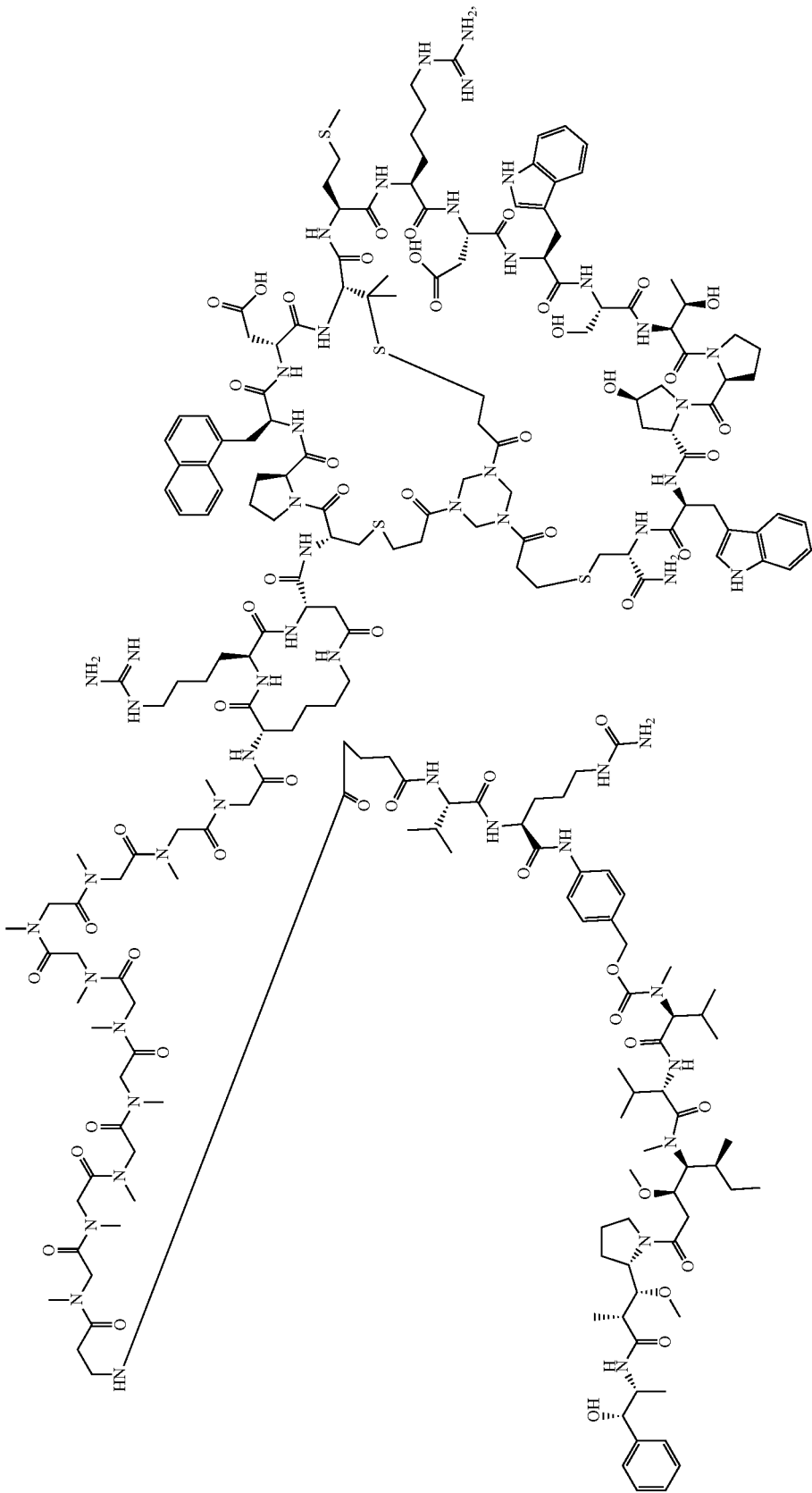

and

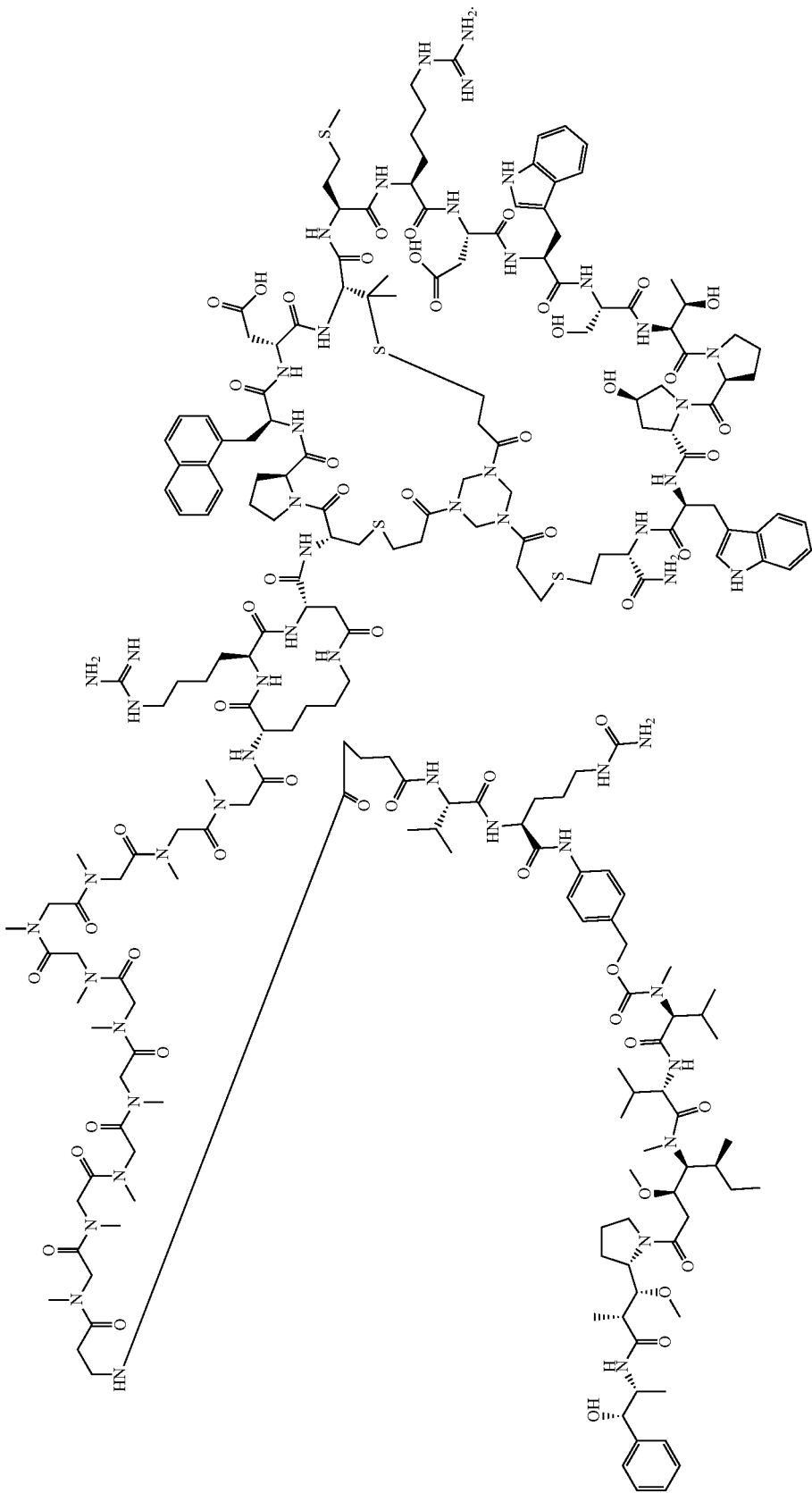

4. A pharmaceutical composition comprising a therapeutically or prophylactically effective amount of the compound or the pharmaceutically acceptable salt thereof according to claim 1.

5. A method of treating Nectin-4 overexpressed solid tumors comprising administering the compound or the pharmaceutically acceptable salt thereof according to claim 1 to a subject.

6. A pharmaceutical composition comprising a therapeutically or prophylactically effective amount of the compound or the pharmaceutically acceptable salt thereof according to claim 2.

7. A pharmaceutical composition comprising a therapeutically or prophylactically effective amount of the compounds or the pharmaceutically acceptable salts thereof according to claim 3.

8. A method of treating Nectin-4 overexpressed solid tumors comprising administering the compound or the pharmaceutically acceptable salt thereof according to claim 2 to a subject.

9. A method of treating Nectin-4 overexpressed solid tumors comprising administering the compounds or the pharmaceutically acceptable salts thereof according to claim 3 to a subject.

* * * * *